(12) United States Patent
Sridharan et al.

(10) Patent No.: US 12,556,432 B2
(45) Date of Patent: Feb. 17, 2026

(54) INDICATING WHETHER DEMODULATION REFERENCE SIGNAL BUNDLING IS APPLIED BY A USER EQUIPMENT

(71) Applicant: QUALCOMM Incorporated, San Diego, CA (US)

(72) Inventors: Gokul Sridharan, Sunnyvale, CA (US); Wanshi Chen, San Diego, CA (US); Mostafa Khoshnevisan, San Diego, CA (US); Hung Dinh Ly, San Diego, CA (US); Peter Gaal, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 594 days.

(21) Appl. No.: 17/649,103

(22) Filed: Jan. 27, 2022

(65) Prior Publication Data
US 2022/0247601 A1    Aug. 4, 2022

Related U.S. Application Data

(60) Provisional application No. 63/143,532, filed on Jan. 29, 2021.

(51) Int. Cl.
*H04L 25/02* (2006.01)
*H04L 5/00* (2006.01)
*H04W 72/0446* (2023.01)
*H04W 72/21* (2023.01)

(52) U.S. Cl.
CPC ........ *H04L 25/0204* (2013.01); *H04L 5/0051* (2013.01); *H04W 72/0446* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 11,979,259 B2* | 5/2024 | Ly | .......... | H04L 5/0051 |
| 2019/0230656 A1 | 7/2019 | Soriaga et al. | | |
| 2019/0254021 A1* | 8/2019 | Hosseini | ........... | H04W 72/1268 |
| 2019/0268904 A1* | 8/2019 | Miao | .................. | H04W 52/02 |
| 2020/0007296 A1* | 1/2020 | Papasakellariou | .... | H04L 1/1861 |

(Continued)

FOREIGN PATENT DOCUMENTS

WO    WO-2021226884    11/2021

OTHER PUBLICATIONS

International Search Report and Written Opinion—PCT/US2022/070399—ISA/EPO—May 16, 2022.

(Continued)

*Primary Examiner* — Saumit Shah
(74) *Attorney, Agent, or Firm* — Harrity & Harrity, LLP

(57) ABSTRACT

Various aspects of the present disclosure generally relate to wireless communication. In some aspects, a user equipment (UE) may receive a request to apply demodulation reference signal (DMRS) bundling to uplink transmissions. The UE may transmit multiple uplink transmissions. The UE may transmit an indication of whether the UE is able to comply with the request based at least in part on whether the UE is able to maintain phase coherence across the multiple uplink transmissions. Numerous other aspects are provided.

30 Claims, 13 Drawing Sheets

(56) References Cited

U.S. PATENT DOCUMENTS

| | | | |
|---|---|---|---|
| 2020/0162133 A1* | 5/2020 | Harrison | H04W 52/248 |
| 2021/0014095 A1 | 1/2021 | Ly et al. | |
| 2022/0225360 A1* | 7/2022 | Yi | H04W 72/1268 |
| 2023/0216711 A1* | 7/2023 | Yao | H04L 25/0228 370/328 |
| 2023/0291523 A1* | 9/2023 | Hasegawa | H04L 5/0094 |
| 2023/0344583 A1* | 10/2023 | Yi | H04L 5/0053 |

OTHER PUBLICATIONS

Qualcomm Incorporated: "Joint Channel Estimation for PUSCH", 3GPP TSG-RAN WG1 Meeting #104e, R1-2101479, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021, XP051971644, 4 Pages.

Vivo: "Discussion on PUCCH Enhancements", 3GPP TSG RAN WG1 #104-e, R1-2100460, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970382, 6 Pages.

\* cited by examiner

INDICATING WHETHER DEMODULATION REFERENCE SIGNAL BUNDLING IS APPLIED BY A USER EQUIPMENT

CROSS-REFERENCE TO RELATED APPLICATION

This patent application claims priority to U.S. Provisional Patent Application No. 63/143,532, filed on Jan. 29, 2021, entitled "INDICATING WHETHER DEMODULATION REFERENCE SIGNAL BUNDLING IS APPLIED BY A USER EQUIPMENT," and assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses for indicating whether demodulation reference signal bundling is applied by a user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some examples, a base station may signal, to a UE, whether to enable demodulation reference signal (DMRS) bundling to physical uplink shared channel (PUSCH) transmissions. DMRS bundling may be used to perform joint channel estimation across slots. In some examples, the base station may indicate to the UE to apply DMRS bundling to PUSCH transmissions for which a set of conditions is satisfied. The set of conditions may relate to whether the UE is capable of maintaining phase coherence across the PUSCH transmissions, such as whether the PUSCH transmissions are transmitted using the same frequency resource allocation, are transmitted using the same transmit power, are transmitted using the same beam, or are transmitted contiguously in time, among other examples. However, in some scenarios, the base station cannot unambiguously determine whether the set of conditions for PUSCH DMRS bundling is satisfied. This may lead to communication errors, inaccurate channel estimation by the base station, or a failure by the base station to properly demodulate the PUSCH transmissions, among other examples.

SUMMARY

Some aspects described herein provide a method of wireless communication performed by a user equipment (UE). The method may include receiving a request to apply demodulation reference signal (DMRS) bundling to uplink transmissions. The method may include transmitting multiple uplink transmissions. The method may include transmitting an indication of whether the UE is able to comply with the request based at least in part on whether the UE is able to maintain phase coherence across the multiple uplink transmissions.

Some aspects described herein provide a method of wireless communication performed by a network entity, such as a base station. The method may include transmitting, to a UE, a request to apply DMRS bundling to uplink transmissions. The method may include receiving multiple uplink transmissions. The method may include receiving an indication of whether the UE is able to comply with the request to apply DMRS bundling to the multiple uplink transmissions.

Some aspects described herein provide a UE for wireless communication. The UE may include a memory and one or more processors operatively coupled to the memory. The UE may be configured to receive a request to apply DMRS bundling to uplink transmissions. The UE may be configured to transmit multiple uplink transmissions. The UE may be configured to transmit an indication of whether the UE is able to comply with the request based at least in part on whether the UE is able to maintain phase coherence across the multiple uplink transmissions.

Some aspects described herein provide a network entity for wireless communication. The network entity may include a memory and one or more processors operatively coupled to the memory. The network entity may be configured to transmit, to a UE, a request to apply DMRS bundling to uplink transmissions. The network entity may be configured to receive multiple uplink transmissions. The network entity may be configured to receive an indication of whether the UE is able to comply with the request to apply DMRS bundling to the multiple uplink transmissions.

Some aspects described herein provide a non-transitory computer-readable medium that stores a set of instructions for wireless communication. The set of instructions may include one or more instructions that, when executed by one or more processors of a UE, cause the UE to receive a request to apply DMRS bundling to uplink transmissions. The one or more instructions may cause the UE to transmit multiple uplink transmissions. The one or more instructions may cause the UE to transmit an indication of whether the UE is able to comply with the request based at least in part on whether the UE is able to maintain phase coherence across the multiple uplink transmissions.

Some aspects described herein provide a non-transitory computer-readable medium that stores a set of instructions for wireless communication. The set of instructions may include one or more instructions that, when executed by one or more processors of a network entity, cause the network entity to transmit, to a UE, a request to apply DMRS bundling to uplink transmissions. The one or more instructions may cause the network entity to receive multiple uplink transmissions. The one or more instructions may cause the network entity to receive an indication of whether the UE is able to comply with the request to apply DMRS bundling to the multiple uplink transmissions.

Some aspects described herein provide an apparatus for wireless communication. The apparatus may include means for receiving a request to apply DMRS bundling to uplink transmissions. The apparatus may include means for transmitting multiple uplink transmissions. The apparatus may include means for transmitting an indication of whether the apparatus is able to comply with the request based at least in part on whether the apparatus is able to maintain phase coherence across the multiple uplink transmissions transmitted.

Some aspects described herein provide an apparatus for wireless communication. The apparatus may include means for transmitting, to a UE, a request to apply DMRS bundling to uplink transmissions. The apparatus may include means for receiving multiple uplink transmissions. The apparatus may include means for receiving an indication of whether the UE is able to comply with the request to apply DMRS bundling to the multiple uplink transmissions.

Aspects generally include a method, apparatus, system, computer program product, non-transitory computer-readable medium, user equipment, network entity, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
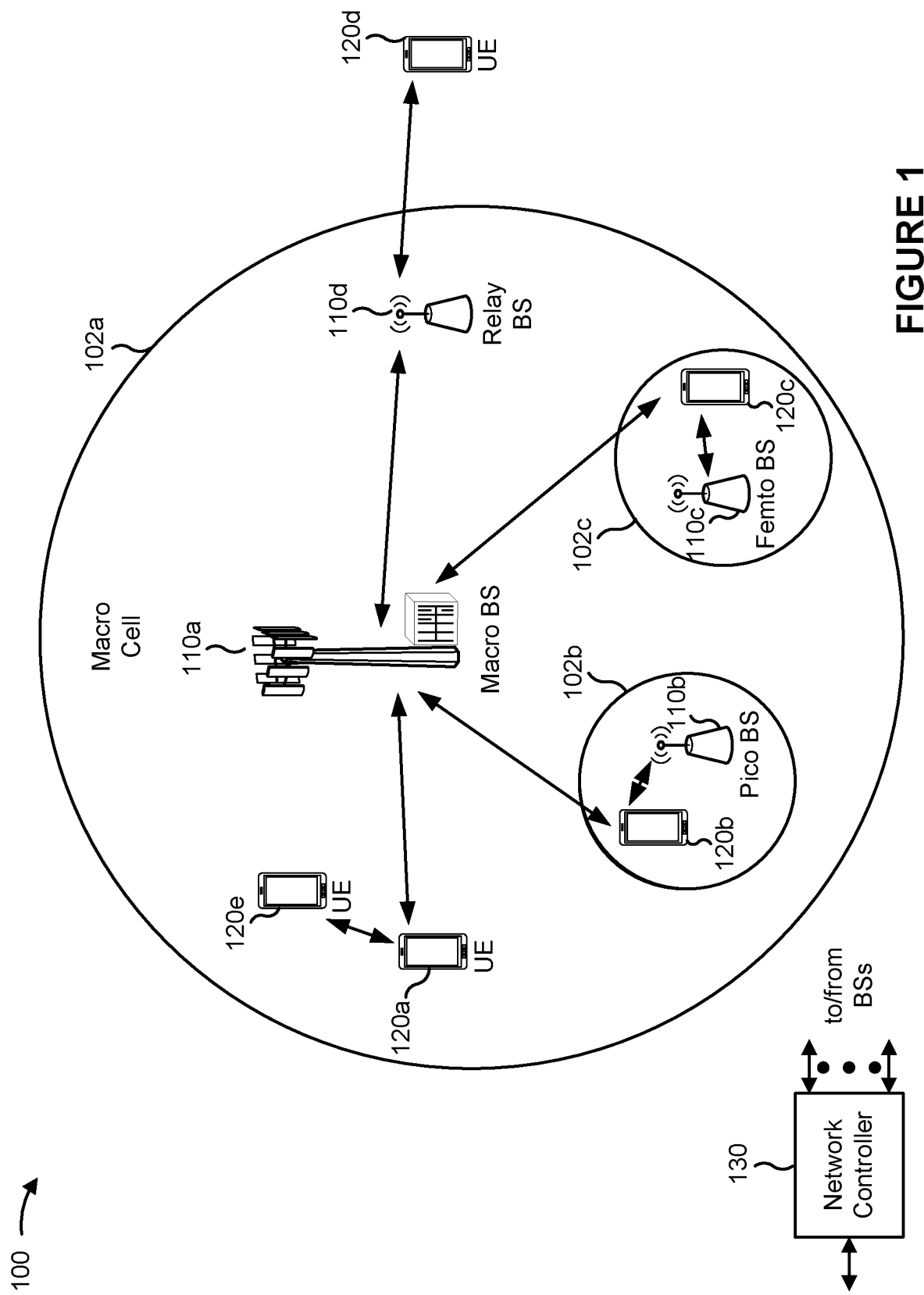
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to enabling a user equipment (UE) to indicate, to a base station, whether the UE was able to comply with a request by the base station to apply demodulation reference signal (DMRS) bundling to uplink communications. Some aspects more specifically relate to UE transmission of an indication of whether the UE was able to comply with a request by the base station for DMRS bundling based at least in part on whether the UE was able to maintain phase coherence across multiple uplink communications, such as physical uplink shared channel (PUSCH) communications or physical uplink control channel (PUCCH) communications. In some aspects, the UE may transmit the indication for a PUSCH transmission in uplink control information (UCI) that is multiplexed with the PUSCH transmission, which enables implicit indication of the PUSCH transmission to which the coherence indication applies. In some aspects, the UE may transmit the indication using a DMRS sequence for a DMRS, and the DMRS sequence selected by the UE may indicate whether the UE was able to comply with the request for DMRS bundling. In some aspects, the UE may transmit the indication using a DMRS port for a DMRS, and the DMRS port selected by the UE may indicate whether the UE was able to comply with the request for DMRS bundling.

Particular aspects of the subject matter described in this disclosure can be implemented to realize one or more of the following potential advantages. In some examples, the described techniques can be used to provide an unambiguous indication of whether different uplink transmissions are phase coherent with one another. As a result, the base station can correctly determine when to perform joint channel estimation for an uplink transmission using multiple DMRSs, thereby improving the accuracy of channel estimation, reducing communication errors, and improving demodulation of the PUSCH transmission. Furthermore, in some examples, the described techniques allow the base station to have some control over DMRS bundling, while improving flexibility of UE transmissions and operations by enabling the UE to apply DMRS bundling in a manner different than that requested by the base station.

FIG. 1 is a diagram illustrating an example 100 of a wireless network in accordance with the present disclosure. The wireless network may be or may include elements of a 5G (NR) network or an LTE network, among other examples. The wireless network may include one or more base stations 110 (shown as BS 110*a*, BS 110*b*, BS 110*c*, and BS 110*d*) and other network entities. A base station (BS) is a network entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) MC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A network controller 130 may couple to the set of BSs 102*a*, 102*b*, 110*a* and 110*b*, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, or a relay, among other examples.

UEs 120 (for example, 120*a*, 120*b*, 120*c*) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
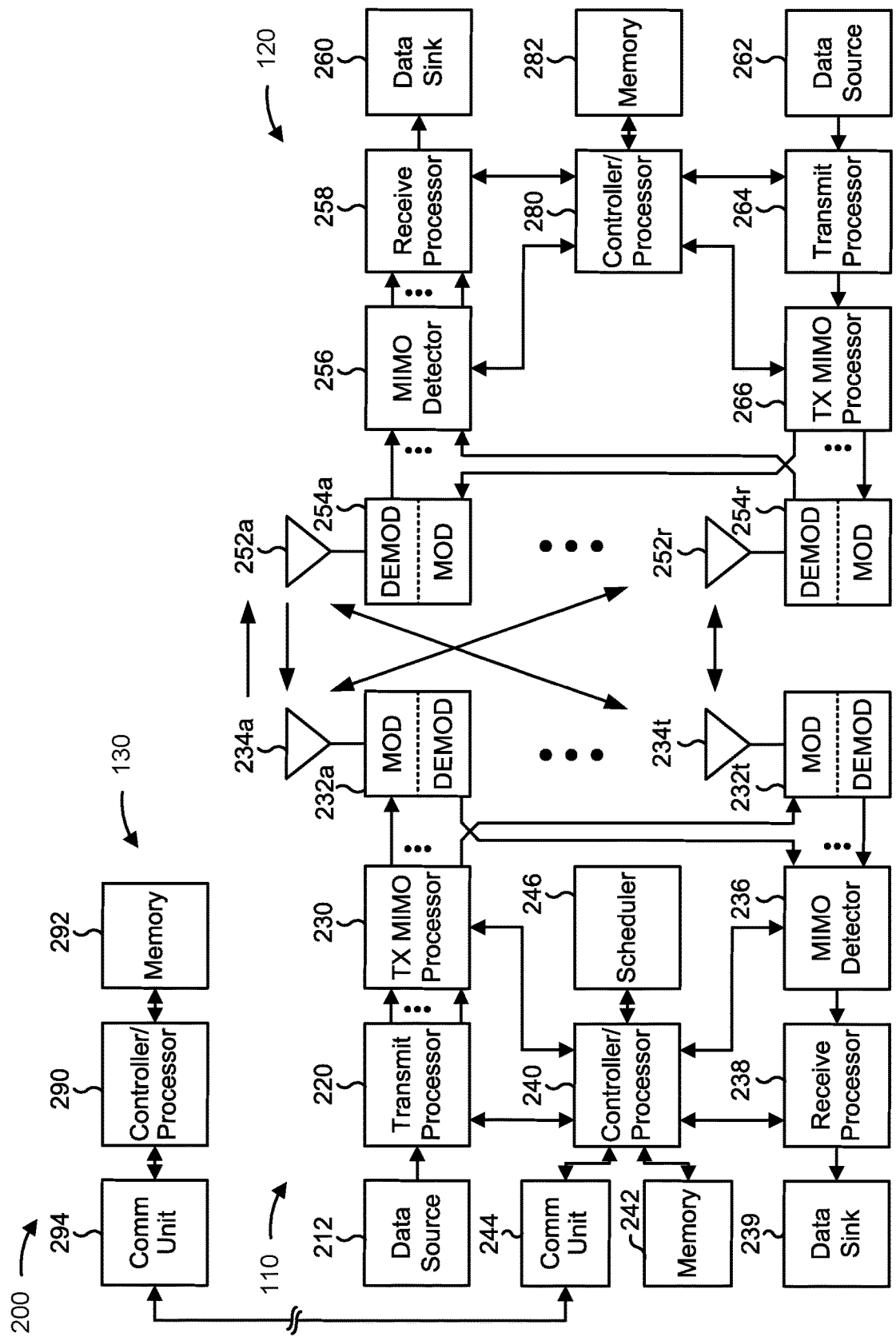
FIG. 2 is a diagram illustrating an example base station (BS) in communication with a user equipment (UE) in a wireless network in accordance with the present disclosure.

FIG. 2 is a diagram illustrating an example 200 of a base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234*a* through 234*t*, and UE 120 may be equipped with R antennas 252*a* through 252*r*, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t*, respectively.

At UE 120, antennas 252*a* through 252*r* may receive the downlink signals from base station 110 or other base stations and may provide received signals to R demodulators (DEMODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with indicating whether demodulation reference signal (DMRS) bundling is applied by a UE 120, as described in more detail elsewhere herein. For example, controller/processor 240 of base station 110, controller/processor 280 of UE 120, or any other component(s) of FIG. 2 may perform or direct operations of, for example, process 1000 of FIG. 10, process 1100 of FIG. 11, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1000 of FIG. 10, process 1100 of FIG. 11, or other processes as described herein. In some aspects, executing instructions may include running the instructions, converting the instructions, compiling the instructions, or interpreting the instructions, among other examples.

In some aspects, the UE (e.g., UE 120) includes means for receiving a request to apply DMRS bundling to uplink transmissions; means for transmitting multiple uplink transmissions; and/or means for transmitting an indication of whether the UE is able to comply with the request based at least in part on whether the UE is able to maintain phase coherence across the multiple uplink transmissions. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining a particular DMRS sequence based at least in part on a formula, for a sequence initialization seed, that includes a parameter that represents whether the UE is able to maintain phase coherence across the uplink transmission and the one or more other uplink transmissions. In some aspects, the UE includes means for transmitting a same DMRS sequence, in association with the uplink transmission, as a DMRS sequence used for the one or more other uplink transmissions to indicate that the UE is able to maintain phase coherence across the uplink transmission and the one or more other uplink transmissions, or means for transmitting a different DMRS sequence, in association with the uplink transmission, than a DMRS sequence used for the one or more other uplink transmissions to indicate that the UE is not able to maintain phase coherence across the uplink transmission and the one or more other uplink transmissions. In some aspects, the UE includes means for selecting the particular DMRS sequence from a pool of DMRS sequences that includes at least three DMRS sequences, wherein the different DMRS sequence is selected as a next DMRS sequence in the pool.

In some aspects, a network entity (e.g., base station 1100 includes means for transmitting, to a UE, a request to apply DMRS bundling to uplink transmissions; means for receiving multiple uplink transmissions; and/or means for receiving an indication of whether the UE is able to comply with the request to apply DMRS bundling to the multiple uplink transmissions. The means for the network entity to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the network entity includes means for performing joint channel estimation across all of the multiple uplink transmissions or a subset of the multiple uplink transmissions based at least in part on the indication of whether the UE is able to comply with the request. In some aspects, the network entity includes means for identifying a subset of the multiple uplink transmissions to which joint channel estimation is to be applied based at least in part on the indication of whether the UE is able to comply with the request; or means for performing joint channel estimation across the subset of the multiple uplink transmissions. In some aspects, the network entity includes means for receiving a same DMRS sequence, in association with the uplink transmission, as a DMRS sequence used for the one or more other uplink transmissions to indicate that the UE is able to maintain phase coherence across the uplink transmission and the one or more other uplink transmissions, or means for receiving a different DMRS sequence, in association with the uplink transmission, than a DMRS sequence used for the one or more other uplink transmissions to indicate that the UE is not able to maintain phase coherence across the uplink transmission and the one or more other uplink transmissions.

Figure 3:
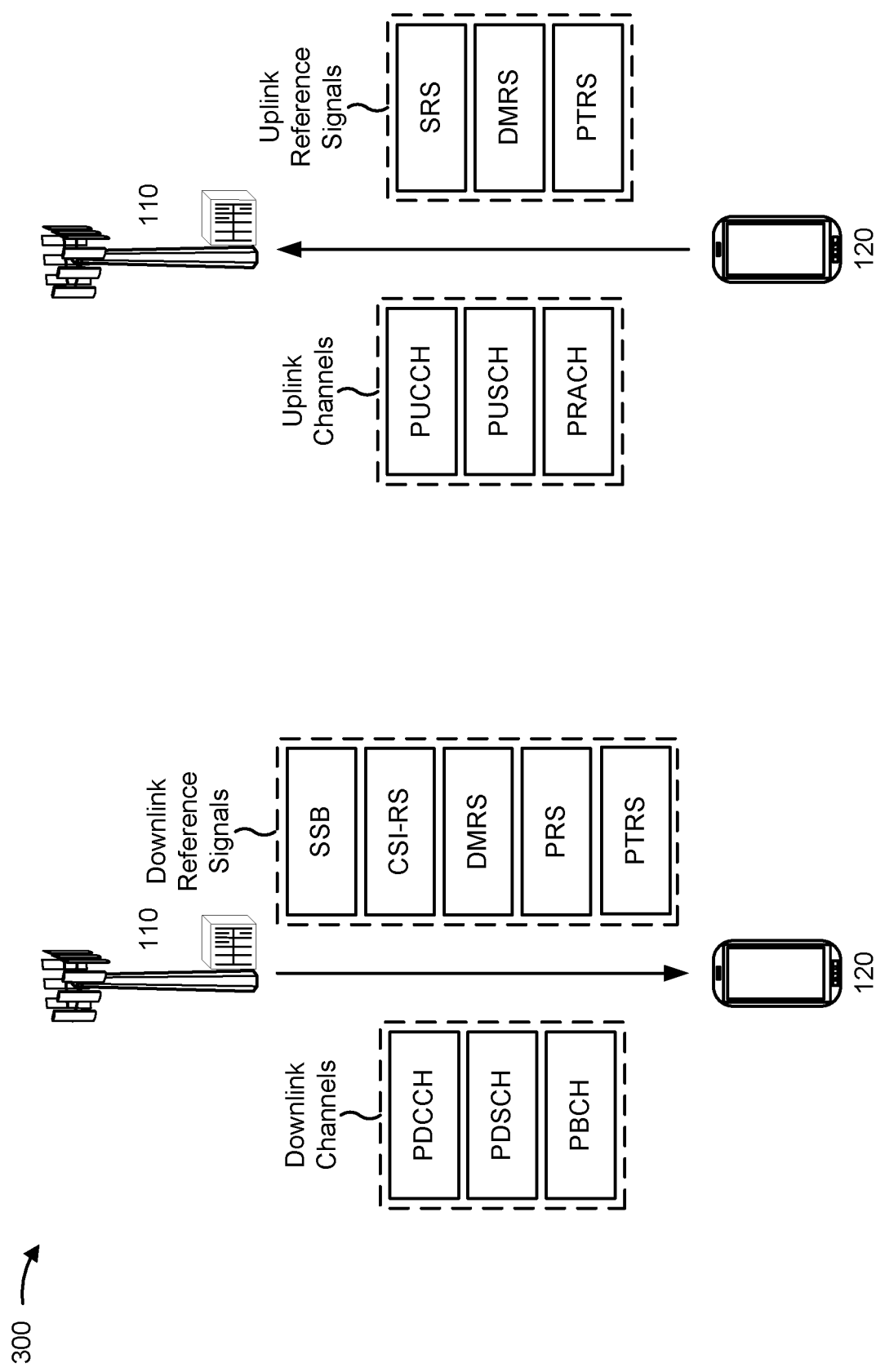
FIG. 3 is a diagram illustrating an example of physical channels and reference signals in a wireless network in accordance with the present disclosure.

FIG. 3 is a diagram illustrating an example 300 of physical channels and reference signals in a wireless network in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (for example, ACK/NACK feedback or ACK/NACK information) in UCI on the PUCCH or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (for example, downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (for example, in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a quantity of transmission layers (for example, a rank), a precoding matrix (for example, a precoder), a modulation and coding scheme (MCS), or a refined downlink beam (for example, using a beam refinement procedure or a beam management procedure), among other examples.

A DMRS may carry information used to estimate a radio channel for demodulation of an associated physical channel (for example, PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (for example, rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (for example, on the PDSCH) and uplink communications (for example, on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (for example, a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (for example, a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

Figure 4:
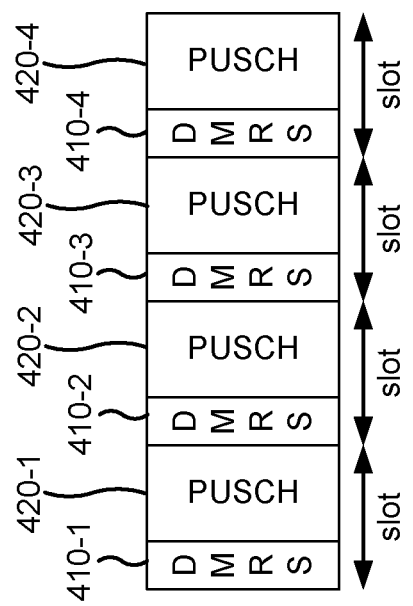
FIG. 4 is a diagram illustrating an example of demodulation reference signal (DMRS) bundling in accordance with the present disclosure.

FIG. 4 is a diagram illustrating an example 400 of DMRS bundling in accordance with the present disclosure. A DMRS for a PUSCH (sometimes called a PUSCH DMRS) may carry information used to estimate a radio channel for demodulation of a PUSCH transmission on the PUSCH. The design and mapping of a PUSCH DMRS may be specific to the PUSCH, for which the DMRS is used for estimation.

When DMRS bundling is not performed, a base station may perform separate channel estimation for different PUSCH transmissions. For example, without DMRS bundling, a base station may perform channel estimation (sometimes called slot-specific channel estimation) for demodulation of a PUSCH transmission using only a DMRS corresponding to that PUSCH transmission (for example, without using any other DMRSs). In some examples, the DMRS corresponding to a PUSCH transmission may be a DMRS that is transmitted in the same time domain resource (for example, the same slot or the same mini-slot) as the PUSCH transmission. Thus, DMRS transmission without DMRS bundling may be referred to as slot-specific DMRS transmission.

Referring to FIG. 4, when DMRS bundling is not performed, the base station may perform separate channel estimation for a first PUSCH transmission 420-1 by using only a first DMRS 410-1 (and by not using any of a second DMRS 410-2, a third DMRS 410-3, or a fourth DMRS 410-4) to estimate the PUSCH for demodulation of the first PUSCH transmission 420-1. As shown, the first DMRS 410-1 and the first PUSCH transmission 420-1 occur in the same slot. Similarly, the base station may perform separate channel estimation for a second PUSCH transmission 420-2 by using only the second DMRS 410-2 to estimate the PUSCH for demodulation of the second PUSCH transmission 420-2, may perform separate channel estimation for a third PUSCH transmission 420-3 by using only the third DMRS 410-3 to estimate the PUSCH for demodulation of the third PUSCH transmission 420-3, and may perform separate channel estimation for a fourth PUSCH transmission 420-4 by using only the fourth DMRS 410-4 to estimate the PUSCH for demodulation of the fourth PUSCH transmission 420-4.

To improve channel estimation, the base station may indicate to (for example, may instruct) a UE to apply (or perform) DMRS bundling for the PUSCH (sometimes called PUSCH DMRS bundling). When DMRS bundling is applied or performed, the base station may perform joint channel estimation (sometimes called coherent channel estimation or cross-slot channel estimation) for different PUSCH transmissions, which improves the accuracy of channel estimation, thereby improving performance. For example, with DMRS bundling, the base station may perform channel estimation for demodulation of a PUSCH transmission using multiple DMRSs corresponding to multiple PUSCH transmissions (for example, the PUSCH transmission being demodulated and one or more other PUSCH transmissions). In some examples, at least one of the DMRSs, used for channel estimation for the PUSCH transmission, is transmitted in a different time domain resource (for example, a different slot or a different mini-slot) as the PUSCH transmission. Thus, DMRS transmission with DMRS bundling may be referred to as cross-slot DMRS transmission.

Referring to FIG. 4, when DMRS bundling is performed, the base station may perform joint channel estimation for the first PUSCH transmission 420-1 using the first DMRS 410-1 and using at least one of the second DMRS 410-2, the third DMRS 410-3, or the fourth DMRS 410-4 to estimate the PUSCH for demodulation of the first PUSCH transmission 420-1. The base station may perform joint channel estimation for the second, third, or fourth PUSCH transmission in a similar manner, such as by using a corresponding DMRS and one or more other DMRSs. Different ones of the first, second, third, and fourth PUSCH transmissions may be different repetitions of the same PUSCH transmission (for example, over multiple slots for PUSCH repetition type A or in the same slot for PUSCH repetition type B), or may be different PUSCH transmissions that carry different transport blocks.

To enable accurate joint estimation of a PUSCH transmission using multiple DMRSs, the multiple DMRSs (and the corresponding PUSCH transmissions) need to be phase coherent with one another. Phase coherence is also sometimes referred to as phase continuity. Thus, when a UE performs DMRS bundling for multiple PUSCH transmissions, the UE must maintain phase coherence (or phase continuity) across the multiple PUSCH transmissions (for example, across the PUSCH symbols in which the PUSCH transmissions are transmitted) to enable the base station to obtain an accurate joint channel estimation for the multiple PUSCH transmissions. In some examples, a first PUSCH transmission and a second PUSCH transmission have phase coherence or have phase continuity if the starting phase of a radio wave for the second PUSCH transmission is the same as the ending phase of a radio wave for the first PUSCH transmission. For example, a first PUSCH transmission and a second PUSCH transmission would have phase coherence or phase continuity if the phase difference between a first radio wave of the first PUSCH transmission and a second radio wave of the second PUSCH transmission, is constant. Conversely, a first PUSCH transmission and a second PUSCH transmission would not have phase coherence or phase continuity if the phase difference between a first radio wave of the first PUSCH transmission and a second radio wave of the second PUSCH transmission changes or is random.

Some changes to transmission parameters between two PUSCH transmissions result in phase discontinuity (a lack of phase coherence) between those two PUSCH transmissions. For example, if the UE uses different frequency resource allocations between the two PUSCH transmissions, uses a different transmit power for the two PUSCH transmissions, or uses different uplink beams to transmit the two PUSCH transmissions, among other examples, then the two PUSCH transmissions may not be phase coherent with one another. As another example, if the two PUSCH transmissions are non-contiguous in a time resource allocation, then the two PUSCH transmissions may not be phase coherent with one another in some examples. For example, if there is a large (for example, greater than a threshold) time gap between the two PUSCH transmissions, then the two PUSCH transmissions may not be phase coherent with one another. For example, another uplink transmission (on another channel, such as a PUCCH transmission, or another reference signal, such as an SRS) may be transmitted between the two PUSCH transmissions (for example, in the time gap), causing the two PUSCH transmissions to not be phase coherent with one another. As another example, a downlink transmission (for example, a PDCCH transmission, a PDSCH transmission, an SSB, or a CSI-RS) may be received between the two PUSCH transmissions, causing the two PUSCH transmissions to not be phase coherent with one another.

In some examples, a base station may signal, to a UE, whether to apply DMRS bundling to PUSCH transmissions (sometimes called PUSCH DMRS bundling), such as using a radio resource control (RRC) message, DCI, or a medium access control (MAC) control element (CE) (collectively, MAC-CE). In some examples, the base station may indicate to the UE to apply DMRS bundling to PUSCH transmissions for which a set of conditions (for example, one or more conditions) is satisfied. The set of conditions may relate to whether the UE is capable of maintaining phase coherence across the PUSCH transmissions, such as whether the PUSCH transmissions are transmitted using the same frequency resource allocation, are transmitted using the same transmit power, are transmitted using the same beam, or are transmitted contiguously in time (or within a threshold amount of time, or without other intervening uplink transmissions or downlink receptions), among other examples. If both the UE and the base station are capable of unambiguously determining whether the set of conditions is satisfied, then enabling DMRS bundling via base station signaling can be used for the UE to determine when to apply PUSCH DMRS bundling and for the base station to determine when to perform joint channel estimation of the PUSCH using bundled DMRSs, and for those determinations to be unambiguously applied to the same DMRSs and corresponding PUSCH transmissions.

However, in some scenarios, the base station cannot unambiguously determine whether the set of conditions for PUSCH DMRS bundling is satisfied. For example, the UE determines a transmit power for uplink power control based at least in part on a pathloss reference signal (PL-RS) measured by the UE. If a pathloss value determined by the UE (based at least in part on the PL-RS) changes between two PUSCH transmissions, then the UE may transmit those two PUSCH transmissions using different transmit powers. However, the base station may not receive information indicating a change to the PL-RS measurement by the UE, the pathloss value determined by the UE, or the change to transmit power used by the UE. As a result, the base station may assume that the two PUSCH transmissions are phase coherent (and transmitted using the same transmit power) when the two PUSCH transmissions are actually not phase coherent (because the two PUSCH transmissions are transmitted using different transmit powers). This may lead to communication errors, inaccurate channel estimation by the base station, or a failure by the base station to properly demodulate the PUSCH transmissions, among other examples. As another example, the UE may transmit one or more uplink transmissions (for example, to another base station) between two PUSCH transmissions, may receive one or more downlink transmissions (for example, from the other base station) between the two PUSCH transmissions, or may transmit or receive one or more sidelink communications (for example, from another UE) between the two PUSCH transmissions, which may interrupt the phase continuity between the two PUSCH transmissions. The base station may not receive information indicating such intervening communications and resulting phase discontinuity between the two PUSCH transmissions and may incorrectly assume phase coherence between the two PUSCH transmissions, leading to errors and inefficiencies as indicated above.

Various aspects relate generally to enabling a UE to indicate, to a base station, whether the UE was able to comply with a request by the base station to apply DMRS bundling to uplink communications. Some aspects more specifically relate to UE transmission of an indication of whether the UE was able to comply with a request by the base station for DMRS bundling based at least in part on whether the UE was able to maintain phase coherence across multiple uplink communications, such as PUSCH communications or PUCCH communications. In some aspects, the UE may transmit the indication for a PUSCH transmission in UCI that is multiplexed with the PUSCH transmission, which enables implicit indication of the PUSCH transmission to which the coherence indication applies. In some aspects, the UE may transmit the indication using a DMRS sequence for a DMRS, and the DMRS sequence selected by the UE may indicate whether the UE was able to comply with the request for DMRS bundling.

Particular aspects of the subject matter described in this disclosure can be implemented to realize one or more of the following potential advantages. In some examples, the described techniques can be used to provide an unambiguous indication of whether different uplink transmissions are phase coherent with one another. As a result, the base station can correctly determine when to perform joint channel estimation for an uplink transmission using multiple DMRSs, thereby improving the accuracy of channel estimation, reducing communication errors, and improving demodulation of the PUSCH transmission. Furthermore, in some examples, the described techniques allow the base station to have some control over DMRS bundling, while improving flexibility of UE transmissions and operations by enabling the UE to apply DMRS bundling in a manner different than that requested by the base station.

Figure 5:
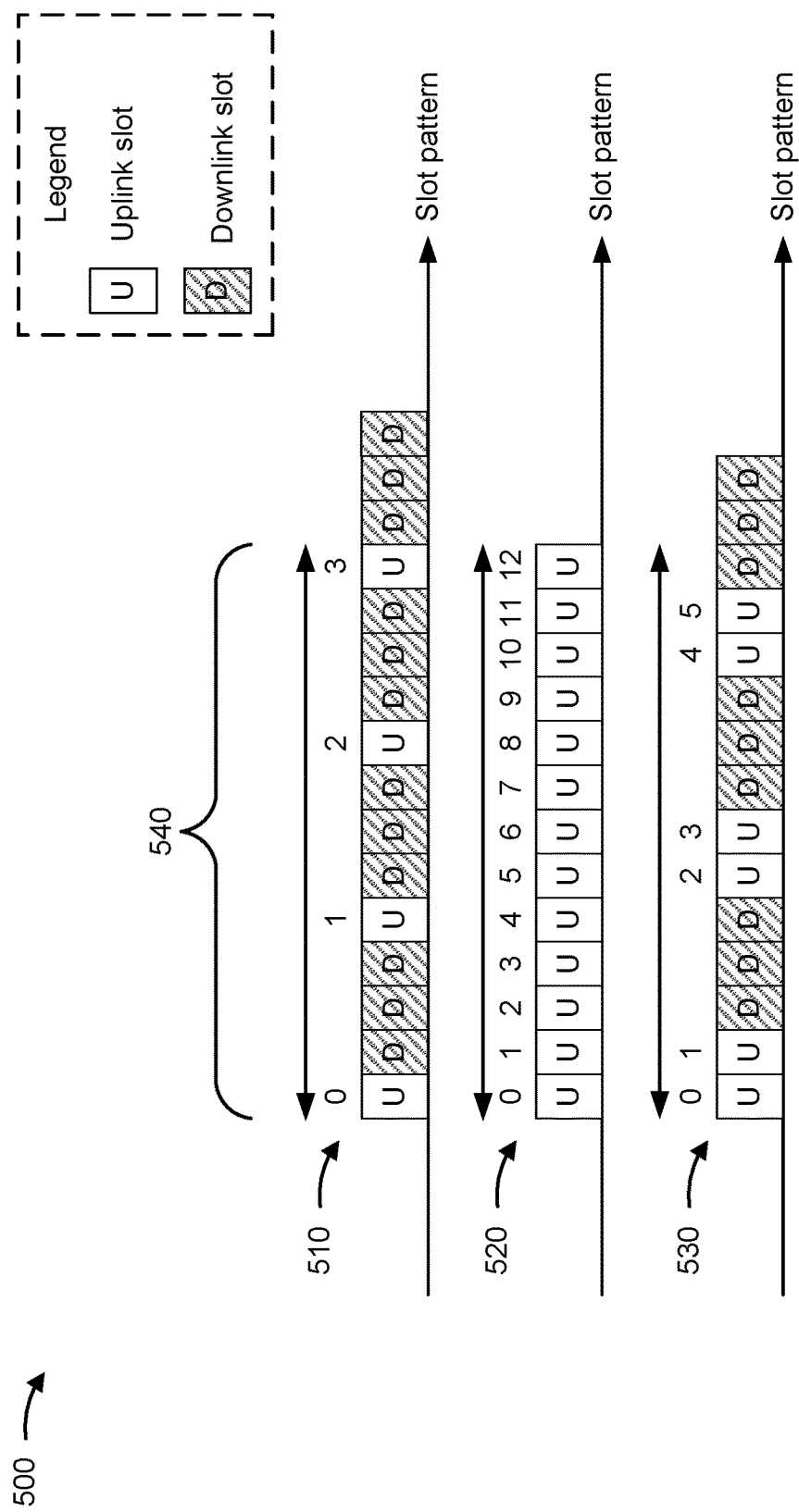
FIG. 5 is a diagram illustrating an example of different slot patterns in accordance with the present disclosure.

FIG. 5 is a diagram illustrating an example 500 of different slot patterns in accordance with the present disclosure. A slot pattern may sometimes be called a TDD slot pattern, a TDD pattern, an UL/DL slot pattern, an UL/DL pattern, a TDD UL/DL slot pattern, or a TDD UL/DL pattern. A slot pattern may indicate, for a sequence of slots, whether each slot in the sequence of slots is configured as an uplink slot or a downlink slot (or a special slot, in some examples). An uplink slot may be used for uplink communication (and not for downlink communication), and a downlink slot may be used for downlink communication (and not for uplink communication). Additionally or alternatively, a slot pattern may indicate whether a UE is configured for TDD or frequency-division duplexing (FDD).

For example, FIG. 5 shows a first slot pattern 510 with one uplink (U) slot, followed by three downlink (D) slots, followed by one uplink slot, followed by three downlink slots, followed by one uplink slot, followed by three downlink slots, followed by one uplink slot, followed by three downlink slots. FIG. 5 also shows a second slot pattern 520 of thirteen consecutive uplink slots. The second slot pattern 520 may be configured, for example, in an FDD system that uses a first frequency for uplink communications and a second (different) frequency for downlink communications. FIG. 5 also shows a third slot pattern 530 of two uplink slots, followed by three downlink slots, followed by two uplink slots, followed by three downlink slots, followed by two uplink slots, followed by three downlink slots. These slot patterns are shown as examples, and other examples may differ from these slot patterns.

As shown, in a time span 540, different UEs, that are configured with these different slot patterns, have a different number of opportunities to transmit uplink communications (for example, a different number of transmission occasions within the same time span 540), such as PUSCH communications or PUCCH communications. For example, a first UE configured with the first slot pattern 510 has four uplink transmission occasions (labeled 0 through 3) within the time span 540, a second UE configured with the second slot pattern 520 has thirteen uplink transmission occasions (labeled 0 through 12) within the time span 540, and a third UE configured with the third slot pattern 530 has six uplink transmission occasions (labeled 0 through 5) within the time span 540. Furthermore, different uplink transmission occasions may be separated by different time gaps.

In some slot pattern configurations, a UE may be capable of transmitting a large number of uplink repetitions in a time span because of a high density of uplink slots in the slot pattern (for example, in an FDD slot pattern, which may have all uplink slots, or in a TDD slot pattern with a high ratio of uplink slots to downlink slots). In other slot pattern configurations, a UE may be capable of transmitting only a small number of uplink repetitions in the same time span because of a low density of uplink slots in the slot pattern (for example, in a TDD slot pattern with a low ratio of uplink slots to downlink slots).

As described above in connection with FIG. 4, to allow a base station to perform joint channel estimation using multiple DMRSs corresponding to multiple uplink communications, the UE must maintain phase coherence across those multiple uplink communications. When multiple uplink communications are transmitted over a short time period, the UE may be more likely to maintain phase coherence as compared to multiple uplink communications transmitted over a longer time period because channel conditions are more likely to change over a longer time period and downlink interruptions are more likely to occur over a longer time period, among other examples.

As described above, various aspects relate generally to enabling a UE to indicate, to a base station, whether the UE was able to comply with a request by the base station to apply DMRS bundling to uplink communications. In some examples, the described techniques can be used to provide the base station with some control over DMRS bundling, while improving flexibility of UE transmissions and operations by enabling the UE to apply DMRS bundling in a manner different than that requested by the base station. This enables the UE to account for various factors specific to the UE, such as a slot pattern configured for the UE, when applying DMRS bundling.

Figure 6:
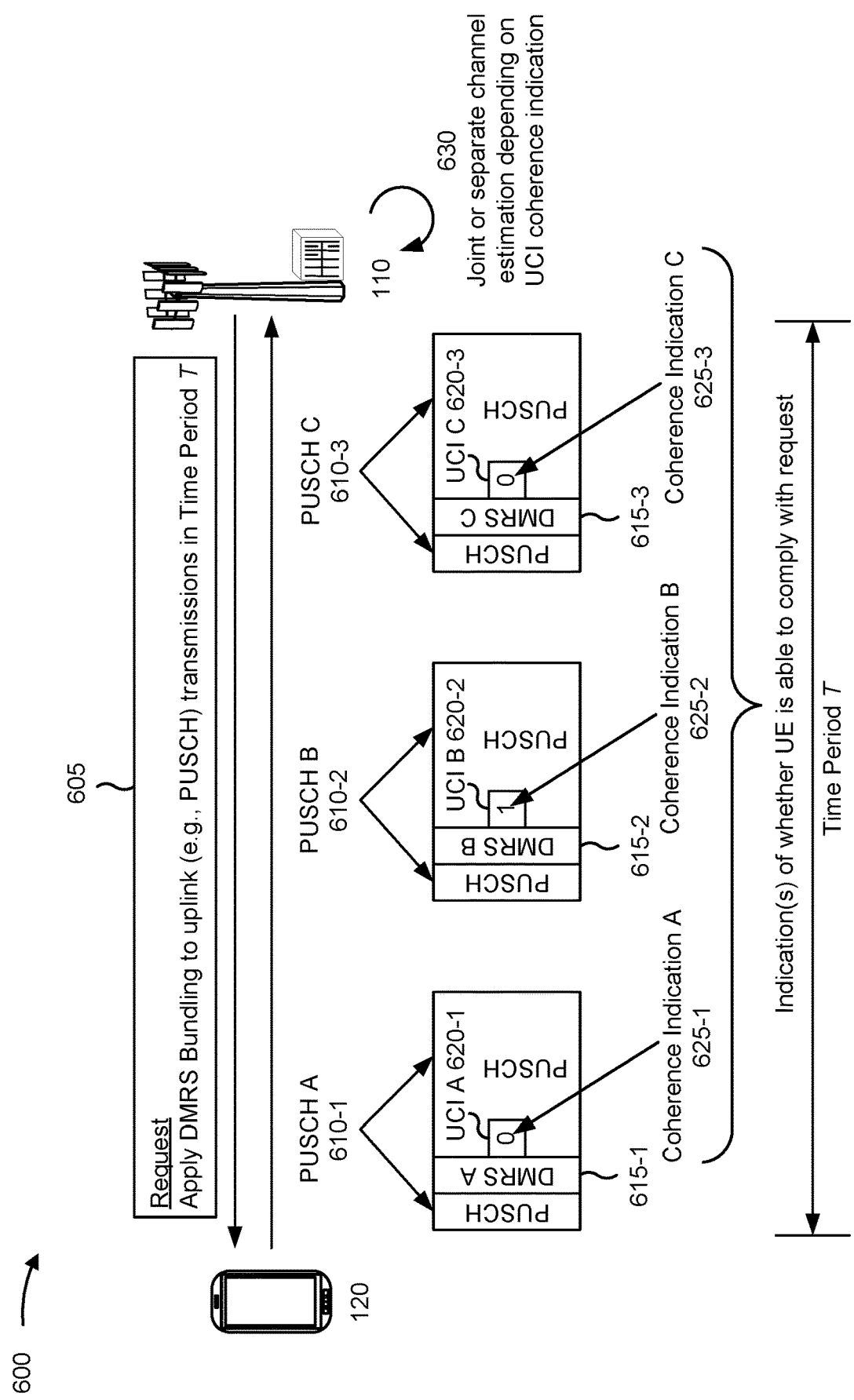
FIGS. 6-9 are diagrams illustrating examples associated with indicating whether demodulation reference signal bundling is applied by a UE in accordance with the present disclosure.

FIG. 6 is a diagram illustrating an example 600 associated with indicating whether DMRS bundling is applied by a UE in accordance with the present disclosure. As shown in FIG. 6, a base station 110 and a UE 120 may communicate with one another. Although example 600 applies to PUSCH transmissions, some aspects described herein apply to PUCCH transmissions.

As shown in FIG. 6, the base station 110 may transmit a request 605 to the UE 120. The request 605 may request that the UE 120 apply DMRS bundling to uplink transmissions (sometimes called uplink DMRS bundling), such as PUSCH transmissions (sometimes called PUSCH DMRS bundling) or PUCCH transmissions (sometimes called PUCCH DMRS bundling). For example, the request 605 may indicate that uplink DMRS bundling is enabled for the UE 120. In some aspects, the UE 120 may transmit a capability report indicating that the UE 120 is capable of uplink DMRS bundling, and the UE 120 may receive the request 605 based at least in part on the capability report. Additionally or alternatively, the UE 120 may transmit a capability report indicating that the UE 120 is capable of supporting transmission of an indication of whether the UE is able to comply with a request for uplink DMRS bundling (described in more detail below), and the UE 120 may receive the request 605 based at least in part on the capability report. If DMRS bundling is applied to a set of uplink transmissions, then the UE must maintain phase coherence (or phase continuity) across the set of uplink transmissions to enable the base station 110 to perform joint channel estimation across the set of uplink transmissions, as described in more detail above in connection with FIG. 4. Additional details of uplink DMRS bundling are described above in connection with FIG. 4.

In some aspects, the request 605 may be transmitted in an RRC message (such as an RRC configuration message or an RRC reconfiguration message), in DCI, or in a MAC-CE. For example, if the request 605 applies to configured grant uplink transmissions that are configured in an RRC message, then the request 605 may be included in the RRC message. Additionally or alternatively, the request 605 may be transmitted in DCI, such as dedicated DCI (for example, with a unique radio access temporary identifier (RNTI), such as a bundling indication RNTI), an uplink grant, or a downlink grant, among other examples. For example, if the request 605 applies to dynamically scheduled PUSCH transmissions, then the request 605 may be transmitted in DCI (for example, an uplink grant) that schedules the PUSCH transmissions. As another example, if the request 605 applies to PUCCH transmissions, then the request 605 may be transmitted in DCI (for example, a PDSCH grant) that schedules the PUCCH transmissions.

In some aspects, the request 605 may include an indication of a time period (shown as a time period T) during which the UE 120 is to apply DMRS bundling to uplink transmissions transmitted during the time period. The base station 110 may indicate the time period as, for example, an absolute time period (for example, 5 milliseconds or 10 milliseconds, among other examples), a quantity of slots (or another time domain resource), or a quantity of uplink transmissions, among other examples. In some aspects, the request 605 may refer to a periodic time period, such as for configured grant uplink transmissions or semi-persistent scheduling (SPS) uplink transmissions. In some aspects, the request 605 includes a first field or information element (IE), to indicate whether to apply DMRS bundling to uplink transmissions, and a second field or IE to indicate the time period during which DMRS bundling is to be applied. Thus the base station 110 may transmit, and the UE 120 may receive, a request 505 to apply DMRS bundling to uplink transmissions for an indicated time period.

As further shown in FIG. 6, the UE 120 may transmit multiple PUSCH transmissions 610 to the base station 110 over time (in different time domain resources, such as slots, mini-slots, or symbols), shown as a first PUSCH transmission 610-1 ("PUSCH A"), a second PUSCH transmission 610-2 ("PUSCH B"), and a third PUSCH transmission 610-3 ("PUSCH C"). For example, the UE 120 may transmit the multiple PUSCH transmissions 610 during the time period T indicated in the request 605. Although three PUSCH transmissions 610 are shown in FIG. 6 as being transmitted during the time period T, some aspects may include a different quantity of PUSCH transmissions 610 that are transmitted during the time period T. As further shown, each PUSCH transmission 610 may be associated with a DMRS 615, shown as a first DMRS 615-1 ("DMRS A") corresponding to PUSCH A, a second DMRS 615-2 ("DMRS B") corresponding to PUSCH B, and a third DMRS 615-3 ("DMRS C") corresponding to PUSCH C. In example 600, a DMRS 615 and a corresponding PUSCH transmission 610 are transmitted in the same slot, with the DMRS 615 being transmitted in a subset of resource elements of that slot (such as according to a DMRS configuration). For example, DMRS A and PUSCH A are transmitted in a first slot, DMRS B and PUSCH B are transmitted in a second slot, and DMRS C and PUSCH C are transmitted in a third slot.

As shown, the UE 120 may transmit UCI 620 in connection with each PUSCH transmission 610, shown as first UCI 620-1 ("UCI A") corresponding to PUSCH A, second UCI 620-2 ("UCI B") corresponding to PUSCH B, and third UCI 620-3 ("UCI C") corresponding to PUSCH C. In some aspects, the UCI 620 is multiplexed with a PUSCH transmission 610 to which the UCI 620 relates (for example, a PUSCH transmission 610 to which the information carried in the UCI 620 applies). For example, the PUSCH transmission 610 may be rate-matched around the UCI 620 in some aspects. In some other aspects, the PUSCH transmission 610 may be punctured with the UCI 620.

As shown, the UE 120 may transmit an indication of whether the UE 120 is able to comply with the request 605 to apply DMRS bundling to multiple PUSCH transmissions transmitted during the time period T. In some aspects, the indication of whether the UE 120 is able to comply with the request 605 may be based at least in part on whether the UE 120 is able to maintain phase coherence across the multiple uplink transmissions. For example, if the UE 120 is able to maintain phase coherence across multiple PUSCH transmissions, then the UE 120 may transmit an indication that the UE 120 is able to apply DMRS bundling to those PUSCH transmissions. As another example, if the UE 120 is not able to maintain phase coherence across multiple PUSCH transmissions, then the UE 120 may transmit an indication that the UE 120 is not able to apply DMRS bundling to those PUSCH transmissions.

As shown in FIG. 6, in some aspects, the UE 120 may transmit the indication of whether the UE 120 is able to comply with the request 605 in the UCI 620. For example, if the request 605 applies to PUSCH transmissions (rather than PUCCH transmissions), then the UE 120 may transmit the indication in UCI 620 that is multiplexed with a PUSCH transmission 610. In FIG. 6, the indication is referred to as a "coherence indication." FIG. 6 shows a first coherence indication 625-1 ("Coherence Indication A") included in UCI A, a second coherence indication 625-2 ("Coherence Indication B") included in UCI B, and a third coherence indication 625-3 ("Coherence Indication C") included in UCI C. A coherence indication 625 may indicate whether a PUSCH transmission 610, corresponding to the coherence indication 625, is coherent with (for example, has phase coherence or phase continuity with) one or more other PUSCH transmissions. The PUSCH transmission 610 corresponding to the coherence indication 625 is sometimes referred to herein as a "primary PUSCH transmission," and the one or more other PUSCH transmissions are sometimes referred to herein as "secondary PUSCH transmission(s)." Thus, the coherence indication 625 may indicate whether a primary PUSCH transmission (transmitted in connection with and relating to the UCI 620 that includes the coherence indication 625) has phase coherence with one or more secondary PUSCH transmissions (other than the primary PUSCH transmission). The coherence indication may also be called a "bundling indication." In some aspects, the primary PUSCH transmission and the secondary PUSCH transmission(s) are different PUSCH transmissions that carry different transport blocks (TBs). Additionally or alternatively, the primary PUSCH transmission and the secondary PUSCH transmission(s) may be different repetitions of a particular PUSCH transmission (for example, carrying the same TB). In some aspects, the UE 120 may transmit a coherence indication based at least in part on reporting, in a capability report, that the UE 120 supports coherence indication for PUSCH DMRS bundling. Additionally or alternatively, the UE 120 may receive, from the base station 110, an instruction (for example, in a configuration, an RRC message, DCI, or a MAC-CE) to transmit a coherence indication for PUSCH DMRS bundling, and the UE 120 may transmit the coherence indication based at least in part on the instruction.

The coherence indication may include one or more bits that indicate the secondary PUSCH transmission with which the primary PUSCH transmission is coherent. In some aspects, the coherence indication consists of only a single bit to conserve signaling overhead. In this example, a first value of the bit (for example, 1) may indicate that the primary PUSCH transmission has phase continuity with one or more secondary PUSCH transmissions, and a second value of the bit (for example, 0) may indicate that the primary PUSCH transmission does not have phase continuity with the one or more secondary PUSCH transmissions.

An indication of the particular secondary PUSCH transmission(s) to which the coherence indication applies may be stored in memory of the UE 120 (for example, based at least in part on a wireless communication standard) or may be signaled to the UE 120 by the base station 110 (for example, in the configuration, in DCI, or in a MAC-CE). In some aspects, the coherence indication applies to a single PUSCH transmission that immediately precedes the primary PUSCH transmission in the time domain. For example, the coherence indication may apply to a previous PUSCH transmission that occurs before (for example, immediately before) the primary PUSCH transmission (for example, in a prior PUSCH occasion that precedes the primary PUSCH transmission without any intervening PUSCH transmissions by the UE 120). In this example, when the coherence indication is a single bit, a first value of the single bit may indicate that the primary PUSCH transmission is coherent with the prior PUSCH transmission, and a second value of the bit may indicate that the primary PUSCH transmission is not coherent with the prior PUSCH transmission. When the coherence indication applies to PUSCH transmission(s) that occur before the primary PUSCH transmission, this improves flexibility for the UE 120 (as compared to when the coherence indication applies to PUSCH transmission(s) that occur after the primary PUSCH transmission) because the UE 120 does not need to commit to maintaining phase continuity for a future PUSCH transmission.

In some aspects, the coherence indication applies to a single PUSCH transmission that immediately follows the primary PUSCH transmission in the time domain. For example, the coherence indication may apply to a next PUSCH transmission that occurs after (for example, immediately after) the primary PUSCH transmission (for example, in a next PUSCH occasion that follows the primary PUSCH transmission without any intervening PUSCH transmissions by the UE 120). In this example, when the coherence indication is a single bit, a first value of the single bit may indicate that the primary PUSCH transmission is coherent with the next PUSCH transmission, and a second value of the bit may indicate that the primary PUSCH transmission is not coherent with the next PUSCH transmission. When the coherence indication applies to PUSCH transmission(s) that occur after the primary PUSCH transmission, this reduces decoding complexity for the base station 110 (as compared to when the coherence indication applies to PUSCH transmission(s) that occur before the primary PUSCH transmission) because the base station 110 will not need to perform channel estimation twice. For example, if the coherence indication applies to PUSCH transmission(s) that occur before the primary PUSCH transmission, then the base station 110 may need to perform first channel estimation to decode the UCI, determine whether to perform joint estimation for the PUSCH in connection with a prior PUSCH transmission based at least in part on the coherence indication in the UCI, and then perform second channel estimation to decode the PUSCH transmission (for example, jointly or separately, depending on the coherence indication). However, performing two channel estimations is less complex than if the coherence indication were not present, which would require performing channel estimation twice (a separate channel estimation and a joint channel estimation) for a PUSCH transmission, as well as performing decoding twice (using the separate channel estimation and the joint channel estimation) for the PUSCH transmission (and any accompanying UCI, if present).

In some aspects, the coherence indication applies to a set of (one or more) PUSCH transmissions that occur in a time window (for example, the time period T). An indication that defines the time window may be stored in memory of the UE 120 (for example, based at least in part on a wireless communication standard) or may be signaled to the UE 120 by the base station 110 (for example, in the configuration, in a DCI, or in a MAC-CE). In some aspects, the time window may be indicated by an offset, a periodicity, or both an offset and a periodicity. In some aspects, the time window is defined with respect to the primary PUSCH transmission or the UCI multiplexed with the primary PUSCH transmission. For example, the primary PUSCH transmission or the UCI may define a beginning of the time window (for example, the start of the time window may be an initial symbol or a final symbol of the primary PUSCH transmission or the UCI), and the time window may have a length defined by a quantity of time domain resources that follow the primary PUSCH transmission or the UCI, such as a quantity of symbols, a quantity of mini-slots, or a quantity of slots, among other examples. As another example, the primary PUSCH transmission or the UCI may define an end of the time window (for example, the end of the time window may be an initial symbol or a final symbol of the primary PUSCH transmission or the UCI), and the time window may have a length defined by a quantity of time domain resources that precede the primary PUSCH transmission or the UCI. As another example, the primary PUSCH transmission or the UCI may occur within the time window (for example, neither at the beginning nor the end of the time window), and the time window may have a length defined by a first quantity of time domain resources that precede the primary PUSCH transmission or the UCI and a second quantity of time domain resources that follow the primary PUSCH transmission or the UCI. The first quantity and the second quantity may be the same or may be different. In this example, when the coherence indication is a single bit, a first value of the single bit may indicate that the primary PUSCH transmission is coherent with all of the (secondary) PUSCH transmissions that occur in the time window, and a second value of the bit may indicate that the primary PUSCH transmission is not coherent with all of the (secondary) PUSCH transmissions that occur in the time window.

In some aspects, the coherence indication includes multiple bits. In this example, each bit (of the multiple bits) may correspond to a different secondary PUSCH transmission, and a value of a bit may indicate whether the primary PUSCH transmission has phase continuity with the secondary PUSCH transmission that corresponds to that bit. For example, a coherence indication bit string of "101" may indicate that the primary PUSCH transmission has phase coherence with a first PUSCH transmission (corresponding to the first "1"), does not have phase coherence with a second PUSCH transmission (corresponding to the "0"), and has phase coherence with a third PUSCH transmission (corresponding to the second "1"). In some aspects, an order of the bits in the bit string may correspond to an order that the secondary PUSCH transmissions occur in the time domain. In some aspects, an initial bit in the bit string may correspond to a PUSCH transmission that occurs immediately after the primary PUSCH transmission (and, for example, all of the bits correspond to PUSCH transmissions that occur after the primary PUSCH transmission). Alternatively, a final bit in the bit string may correspond to a PUSCH transmission that occurs immediately before the primary PUSCH transmission (and, for example, all of the bits correspond to PUSCH transmissions that occur before the primary PUSCH transmission). Alternatively, one or more bits in the bit string may correspond to one or more PUSCH transmissions that occur before the primary PUSCH transmission, and one or more other bits in the bit string may correspond to one or more PUSCH transmissions that occur after the primary PUSCH transmission.

In some aspects, the coherence indication may apply to an absolute previous PUSCH transmission (with no intervening PUSCH transmissions from the primary PUSCH transmission), an absolute subsequent PUSCH transmission (with no intervening PUSCH transmissions from the primary PUSCH transmission), or all PUSCH transmissions in a time window, regardless of transmission parameters associated with those PUSCH transmissions. Alternatively, the coherence indication may apply to a previous PUSCH transmission that satisfies a set of conditions (for example, a PUSCH transmission that occurs closest in time prior to the primary PUSCH transmission and that satisfies the set of conditions), a subsequent PUSCH transmission that satisfies the set of conditions (for example, a PUSCH transmission that occurs closest in time after the primary PUSCH transmission and that satisfies the set of conditions), or only the PUSCH transmissions in a time window that satisfy the set of conditions. The set of (one or more) conditions may relate to whether a transmission parameter of a secondary PUSCH transmission is the same as a corresponding transmission parameter of the primary PUSCH transmission. The transmission parameter may include, for example, a resource block (RB) allocation, an uplink beam, a transmit power, or a precoder (for example, a precoding matrix). For example, the coherence indication may apply to secondary PUSCH transmissions that have a same RB allocation as the primary PUSCH transmission, that are transmitted on the same uplink beam as the primary PUSCH transmission, that are transmitted with the same transmit power as the primary PUSCH transmission, that have a same precoding (for example, that are transmitted using the same precoder) as the primary PUSCH transmission, or a combination thereof.

In some aspects, an absolute value of a bit in the coherence indication may indicate whether a corresponding secondary PUSCH transmission is coherent with the primary PUSCH transmission (for example, independent of bit values in any other coherence indications). In this example, a first value of the bit (for example, 1) may indicate that the primary PUSCH transmission and the secondary PUSCH transmission have phase continuity, and a second value of the bit (for example, 0) may indicate that the primary PUSCH transmission and the secondary PUSCH transmission do not have phase continuity, independent of bit values in any other coherence indications.

Alternatively, a relative value of a bit in the coherence indication, relative to a bit value in another coherence indication, may indicate whether a corresponding secondary PUSCH transmission is coherent with the primary PUSCH transmission. In this example, the bit value is used as a toggle to indicate phase coherence. For example, if a value of a bit in a coherence indication of a primary PUSCH transmission is the same as a value of a bit in a prior (or later) coherence indication associated with a secondary PUSCH transmission, then this may indicate that the primary PUSCH transmission is coherent with the secondary PUSCH transmission. Conversely, if a value of a bit in a coherence indication of a primary PUSCH transmission is different from a value of a bit in a prior (or later) coherence indication associated with a secondary PUSCH transmission, then this may indicate that the primary PUSCH transmission is not coherent with the secondary PUSCH transmission.

In some aspects, if hybrid automatic repeat request acknowledgement (HARQ-ACK) information, channel state information (CSI), or a scheduling request (SR) is present in UCI multiplexed with the primary PUSCH transmission, then the UE 120 may append the coherence indication for the primary PUSCH transmission to the HARQ-ACK information, the CSI, or the SR to conserve signaling overhead. If the HARQ-ACK information, the CSI, and the SR are not present in UCI multiplexed with the primary PUSCH transmission, then the UE 120 may transmit the coherence indication for the primary PUSCH transmission independently in UCI multiplexed with the primary PUSCH transmission (for example, the UCI may consist of only the coherence indication and not any other information).

In some aspects, the UE 120 may transmit the indication of whether the UE 120 is able to comply with the request 605 in association with every uplink transmission indicated by the request 605 (for example, every uplink transmission included in the time period T). For example, in FIG. 6, a coherence indication 625 is transmitted in each UCI 620 corresponding to each PUSCH transmission 610. Thus, the indication may be transmitted in association with every primary uplink transmission indicated by the request 605 regardless of whether the UE 120 is able to comply with the request 605 (for example, regardless of whether the UE 120 is able to maintain phase coherence between that primary uplink transmission and one or more secondary uplink transmissions).

Alternatively, the UE 120 may transmit the indication of whether the UE 120 is able to comply with the request 605 only if the UE 120 is not able to comply with the request 605 (for example, only if the UE 120 is not able to maintain phase coherence). For example, if the UE 120 determines that the UE 120 is not able to maintain phase coherence between a primary uplink transmission and one or more secondary uplink transmissions (for example, a previous uplink transmission or a next uplink transmission), then the UE 120 may transmit, in association with the primary uplink transmission (for example, in UCI multiplexed with the primary uplink transmission), an indication that the UE 120 is not able to maintain phase coherence for the primary uplink transmission. If the UE 120 determines that the UE 120 is able to maintain phase coherence between a primary uplink transmission and one or more secondary uplink transmissions (for example, a previous uplink transmission or a next uplink transmission), then the UE 120 may refrain from transmitting, in association with the primary uplink transmission (for example, in UCI multiplexed with the primary uplink transmission), an explicit indication that the UE 120 is able to maintain phase coherence for the primary uplink transmission. If the explicit indication is not present for a primary uplink transmission, then this may implicitly indicate to the base station 110 that the UE 120 is able to maintain phase coherence for the primary uplink transmission, while reducing signaling overhead.

As further shown in FIG. 6, in an operation 630, the base station 110 may perform joint channel estimation or separate channel estimation based at least in part on the indication of whether the UE 120 is able to comply with the request 605. For example, if the indication indicates that the primary PUSCH transmission is coherent with a secondary PUSCH transmission, then the base station 110 may perform joint channel estimation for the primary PUSCH transmission and the secondary PUSCH transmission (or a group of secondary PUSCH transmissions, depending on one or more coherence indications). Conversely, if the indication indicates that the primary PUSCH transmission is not coherent with a secondary PUSCH transmission, then the base station 110 may perform separate joint channel estimation for the primary PUSCH transmission, independent of channel estimation performed for the secondary PUSCH transmission. Thus, the base station 110 may determine whether to perform separate joint channel estimation or joint channel estimation for the primary PUSCH transmission based at least in part on the coherence indication. Furthermore, if the base station 110 determines to perform joint channel estimation for the primary PUSCH transmission, then the base station 110 may determine which secondary PUSCH transmissions are coherent with the primary PUSCH transmission, for performing the joint channel estimation, based at least in part on the coherence indication associated with the primary PUSCH transmission (and one or more other coherence indications, in some aspects).

By enabling the UE 120 to indicate or control PUSCH DMRS bundling using an indication of whether the UE 120 was able to comply with a DMRS bundling request transmitted by the base station 110, techniques and apparatuses described herein can be used to provide an unambiguous indication of whether different PUSCH transmissions are phase coherent with one another. As a result, the base station 110 can correctly determine when to perform joint channel estimation for a PUSCH transmission using multiple DMRSs, thereby improving the accuracy of channel estimation, reducing communication errors, and improving demodulation of the PUSCH transmission. Furthermore, the techniques described herein allow the base station 110 to instruct a UE 120 regarding which uplink transmissions to apply DMRS bundling, while allowing the UE 120 to flexibly modify those instructions.

In some aspects, the DMRS bundling may be performed during a random access channel (RACH) procedure, such as a 2-step RACH procedure or a 4-step RACH procedure. For example, the base station 110 may transmit the request in a RACH message (e.g., a downlink RACH message, such as a random access response or Msg2 of a 4-step RACH procedure). The UE 120 may apply DMRS bundling to PUSCH communications, transmitted by the UE 120 as part of the RACH procedure, based at least in part on the request. For example, the UE 120 may transmit multiple uplink communications (e.g., multiple PUSCH communications) as part of a RACH message (e.g., an uplink RACH message, such as Msg3 of a 4-step RACH procedure). The UE 120 may apply DMRS bundling to these multiple uplink communications as described herein. Additionally, or alternatively, the UE 120 may transmit an indication of whether the UE is able to comply with the request for the multiple uplink communications, as further described herein.

As described herein, in some aspects, the UE 120 may transmit an indication of whether the UE is able to comply with the request for the multiple uplink communications based at least in part on whether the UE 120 is able to maintain phase coherence across the multiple uplink transmissions. Similarly, in some aspects, the UE 120 may transmit the indication of whether the UE is able to comply with the request for the multiple uplink communications based at least in part on whether the UE 120 is able to maintain power consistency and/or phase continuity subject to power consistency and/or phase continuity requirements.

Figure 7:
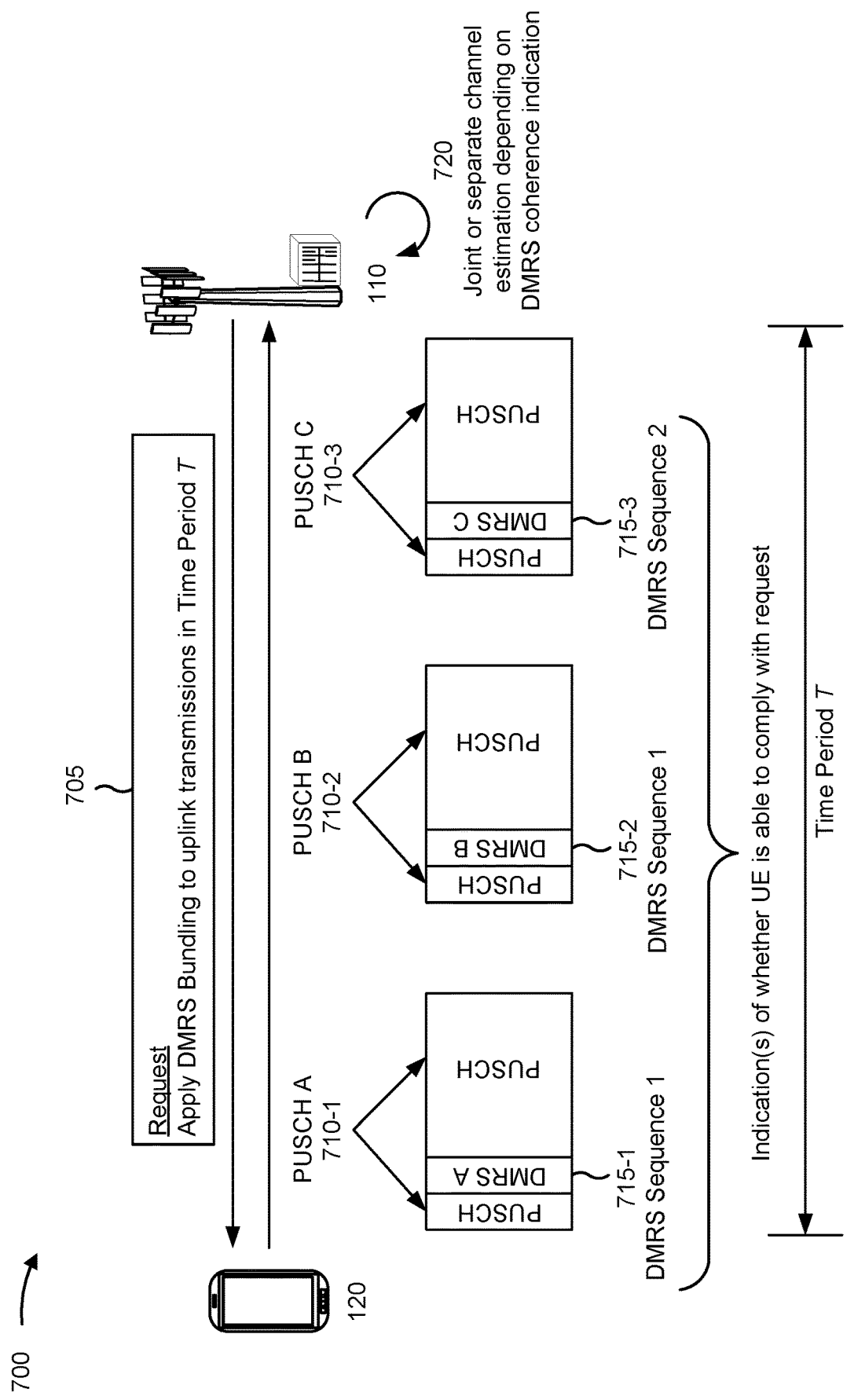

FIG. 7 is a diagram illustrating an example 700 associated with indicating whether DMRS bundling is applied by a UE in accordance with the present disclosure. As shown in FIG. 7, a base station 110 and a UE 120 may communicate with one another. Although example 700 is described in connection with PUSCH transmissions, the techniques described in connection with FIG. 7 may also be applied to PUCCH transmissions.

As shown in FIG. 7, the base station 110 may transmit a request 705 to the UE 120, in a similar manner as described above in FIG. 6. The request 705 may request that the UE 120 apply DMRS bundling to uplink transmissions (sometimes called uplink DMRS bundling), such as PUSCH transmissions (sometimes called PUSCH DMRS bundling) or PUCCH transmissions (sometimes called PUCCH DMRS bundling), as described in more detail above in connection with FIG. 6.

As further shown in FIG. 7, the UE 120 may transmit multiple PUSCH transmissions 710 to the base station 110 over time (in different time domain resources, such as slots, mini-slots, or symbols), shown as a first PUSCH transmission 710-1 ("PUSCH A"), a second PUSCH transmission 710-2 ("PUSCH B"), and a third PUSCH transmission 710-3 ("PUSCH C"), as described in more detail above in connection with FIG. 6. Although FIG. 7 describes an indication of whether the UE 120 is able to comply with a request 705 for DMRS bundling for PUSCH transmissions, the techniques described in connection with FIG. 7 may additionally or alternatively be applied to PUCCH transmissions.

As further shown, each PUSCH transmission 710 may be associated with a DMRS 715, shown as a first DMRS 715-1 ("DMRS A") corresponding to PUSCH A, a second DMRS 715-2 ("DMRS B") corresponding to PUSCH B, and a third DMRS 715-3 ("DMRS C") corresponding to PUSCH C. In example 700, a DMRS 715 and a corresponding PUSCH transmission 710 are transmitted in the same slot, with the DMRS 715 being transmitted in a subset of resource elements of that slot (such as according to a DMRS configuration). For example, DMRS A and PUSCH A are transmitted in a first slot, DMRS B and PUSCH B are transmitted in a second slot, and DMRS C and PUSCH C are transmitted in a third slot.

As shown, the UE 120 may transmit an indication of whether the UE 120 is able to comply with the request 705 to apply DMRS bundling to multiple PUSCH transmissions transmitted during the time period T. In some aspects, the indication of whether the UE 120 is able to comply with the request 705 may be based at least in part on whether the UE 120 is able to maintain phase coherence across the multiple uplink transmissions. For example, if the UE 120 is able to maintain phase coherence across multiple PUSCH transmissions, then the UE 120 may transmit an indication that the UE 120 is able to apply DMRS bundling to those PUSCH transmissions. As another example, if the UE 120 is not able to maintain phase coherence across multiple PUSCH transmissions, then the UE 120 may transmit an indication that the UE 120 is not able to apply DMRS bundling to those PUSCH transmissions.

As shown in FIG. 7, in some aspects, the UE 120 may transmit a particular DMRS sequence to indicate whether the UE 120 is able to comply with the request 705. In some aspects, the DMRS sequence may be a Zadoff-Chu sequence. A Zadoff-Chu sequence is a complex-valued mathematical sequence that, when applied to a signal, generates a new signal of constant amplitude. In some aspects, the UE 120 may determine (for example, may identify, select, or generate) a DMRS sequence to indicate whether a PUSCH transmission 710, corresponding to the DMRS 715 for which the DMRS sequence is determined, is coherent with (for example, has phase coherence or phase continuity with) one or more other PUSCH transmissions. The PUSCH transmission 710 corresponding to the DMRS 715 or the DMRS sequence is sometimes referred to herein as a "primary PUSCH transmission," and the one or more other PUSCH transmissions are sometimes referred to herein as "secondary PUSCH transmission(s)." Thus, the DMRS sequence may indicate whether a primary PUSCH transmission (transmitted in connection with and relating to the DMRS 715 that is transmitted using the DMRS sequence) has phase coherence with one or more secondary PUSCH transmissions (other than the primary PUSCH transmission).

In some aspects, the particular DMRS sequence transmitted in connection with a primary PUSCH transmission may indicate whether the UE 120 is able to comply with the request 705 for that primary PUSCH transmission. For example, the particular DMRS sequence transmitted in connection with a primary PUSCH transmission may indicate whether the UE 120 is able to maintain phase coherence across that primary PUSCH transmission and one or more secondary PUSCH transmissions. For example, the UE 120 may transmit a first DMRS sequence (shown as DMRS Sequence 1) in connection with a primary PUSCH transmission if the UE 120 is able to maintain phase coherence across the primary PUSCH transmission and one or more secondary PUSCH transmissions. As another example, the UE 120 may transmit a second (different) DMRS sequence (shown as DMRS Sequence 2) in connection with a primary PUSCH transmission if the UE 120 is not able to maintain phase coherence across the primary PUSCH transmission and one or more secondary PUSCH transmissions. Thus, the first DMRS sequence may indicate that the UE 120 is able to comply with the request 705 and is able to maintain phase coherence, and the second DMRS sequence may indicate that the UE 120 is not able to comply with the request 705 and is not able to maintain phase coherence.

The UE 120 may generate a DMRS sequence using a sequence initialization seed or an initialization value (for example, $c_{init}$). The UE 120 may determine the sequence initialization seed using a formula that includes multiple parameters. In some aspects, the formula may include a parameter that represents whether the UE 120 is able to maintain phase coherence. For example, when generating the sequence initialization seed for a DMRS sequence corresponding to a primary PUSCH transmission, the UE 120 may apply a formula that includes a parameter that indicates whether the UE 120 is able to maintain phase coherence across the primary PUSCH transmission and one or more secondary PUSCH transmissions. Thus, the value of the sequence initialization seed and the resulting DMRS sequence may be different depending on whether the UE 120 is able to maintain phase coherence.

The coherence indication may include one or more bits that indicate the secondary PUSCH transmission with which the primary PUSCH transmission is coherent. In some aspects, the coherence indication consists of only a single bit to conserve signaling overhead. In this example, a first value of the bit (for example, 1) may indicate that the primary PUSCH transmission has phase continuity with one or more secondary PUSCH transmissions, and a second value of the bit (for example, 0) may indicate that the primary PUSCH transmission does not have phase continuity with the one or more secondary PUSCH transmissions.

In some aspects, an absolute value of the DMRS sequence (for example, a complex value) may indicate whether the UE 120 is able to maintain phase coherence. For example, the UE 120 may transmit a first DMRS sequence if the UE 120 is able to maintain phase coherence, and may transmit a second DMRS sequence if the UE 120 is not able to maintain phase coherence.

Alternatively, a relative value of the DMRS sequence, as compared to one or more other transmitted DMRS sequences, may indicate whether the UE 120 is able to maintain phase coherence. This technique is sometimes referred to herein as "DMRS sequence toggling." For example, the UE 120 may transmit a first DMRS sequence for an initial PUSCH transmission, and may continue to transmit the first DMRS sequence for other PUSCH transmissions that are phase coherent with the initial PUSCH transmission. When the UE 120 is unable to maintain phase coherence for a particular PUSCH transmission, then the UE 120 may transmit a second DMRS sequence for that particular PUSCH transmission. For subsequent PUSCH transmission that follow the particular PUSCH transmission, the UE 120 may continue to transmit the second DMRS sequence if those subsequent PUSCH transmission are phase coherent with the particular PUSCH transmission (for example, instead of transmitting the first DMRS sequence to indicate phase coherence, which the UE 120 would do if the absolute value of the DMRS sequence indicated whether the UE 120 is able to maintain phase coherence). Thus, in some aspects the UE 120 may use a same DMRS sequence across multiple consecutive PUSCH transmissions to indicate phase coherence, and may switch to a different DMRS sequence to indicate a lack of phase coherence.

In some aspects, the UE 120 may store (in memory of the UE 120) or may be configured with a pool of DMRS sequences. In some aspects, the pool may include at least three DMRS sequences. When the UE 120 applies the DMRS toggling technique described above, the UE 120 may select a first DMRS sequence in the pool (for example, DMRS sequence 1 in a pool of {1, 2, 3}) and may use the first DMRS sequence until phase continuity cannot be maintained. At that point, the UE 120 may select a second DMRS sequence in the pool (for example, DMRS sequence 2 in the pool of {1, 2, 3}) and may use the second DMRS sequence until phase continuity cannot be maintained. At that point, the UE 120 may select a third DMRS sequence in the pool (for example, DMRS sequence 3 in the pool of {1, 2, 3}) and may use the third DMRS sequence until phase continuity cannot be maintained. When the UE 120 reaches the last DMRS sequence in the pool, the UE 120 may cycle back to the first DMRS sequence in the pool and repeat the process. This may improve decoding performance at the base station 110 as compared to using only two DMRS sequences, as described in more detail below in connection with FIG. 8.

Although the techniques described in connection with FIG. 7 use a DMRS sequence to indicate whether the UE 120 is able to comply with the request 705 and whether the UE 120 is able to maintain phase coherence, the techniques described in connection with FIG. 7 may use a DMRS port instead of or in addition to a DMRS sequence, in some aspects. For example, the UE 120 may transmit a DMRS 715 on a particular DMRS port to indicate phase coherence or lack of phase coherence in connection with a PUSCH transmission 710 corresponding to that DMRS 715. In some aspects, the UE 120 may transmit the DMRS 715 on a first DMRS port to indicate phase coherence, and may transmit the DMRS 715 on a second DMRS port to indicate a lack of phase coherence. Alternatively, the UE 120 may toggle between DMRS ports or may select a DMRS port from a pool of DMRS ports to indicate phase coherence or lack of phase coherence, in a similar manner as described in connection with DMRS sequences. In some aspects, the UE 120 may transmit the same DMRS sequence regardless of a DMRS port used by the UE 120. In some aspects, the UE 120 may transmit different DMRS sequence on different DMRS ports to provide clearer differentiation. In general, the UE 120 may use one or more DMRS resources (for example, DMRS sequences, DMRS ports, other DMRS transmission parameters, or a combination thereof) to indicate phase coherence or a lack of phase coherence in a similar manner as described herein in connection with DMRS sequences.

As described above in connection with FIG. 6, an indication transmitted using a DMRS sequence may apply to a single PUSCH transmission that immediately precedes the primary PUSCH transmission in the time domain, may apply to a single PUSCH transmission that immediately follows the primary PUSCH transmission in the time domain, or may apply to a set of (one or more) PUSCH transmissions that occur in a time window (for example, the time period T). As also described above in connection with FIG. 6, an indication transmitted using a DMRS sequence may apply to an absolute previous PUSCH transmission (with no intervening PUSCH transmissions from the primary PUSCH transmission), an absolute subsequent PUSCH transmission (with no intervening PUSCH transmissions from the primary PUSCH transmission), or all PUSCH transmissions in a time window, regardless of transmission parameters associated with those PUSCH transmissions. Alternatively, an indication transmitted using a DMRS sequence may apply to a previous PUSCH transmission that satisfies a set of conditions (for example, a PUSCH transmission that occurs closest in time prior to the primary PUSCH transmission and that satisfies the set of conditions), a subsequent PUSCH transmission that satisfies the set of conditions (for example, a PUSCH transmission that occurs closest in time after the primary PUSCH transmission and that satisfies the set of conditions), or only the PUSCH transmissions in a time window that satisfy the set of conditions.

As further shown in FIG. 7, in an operation 720, the base station 110 may perform joint channel estimation or separate channel estimation based at least in part on the indication of whether the UE 120 is able to comply with the request 705. For example, if the indication indicates that the primary PUSCH transmission is coherent with a secondary PUSCH transmission, then the base station 110 may perform joint channel estimation for the primary PUSCH transmission and the secondary PUSCH transmission (or a group of secondary PUSCH transmissions, depending on one or more coherence indications). Conversely, if the indication indicates that the primary PUSCH transmission is not coherent with a secondary PUSCH transmission, then the base station 110 may perform separate joint channel estimation for the primary PUSCH transmission, independent of channel estimation performed for the secondary PUSCH transmission. Thus, the base station 110 may determine whether to perform separate joint channel estimation or joint channel estimation for the primary PUSCH transmission based at least in part on the coherence indication. Furthermore, if the base station 110 determines to perform joint channel estimation for the primary PUSCH transmission, then the base station 110 may determine which secondary PUSCH transmissions are coherent with the primary PUSCH transmission, for performing the joint channel estimation, based at least in part on the coherence indication associated with the primary PUSCH transmission (and one or more other coherence indications, in some aspects). In some aspects, the base station 110 may detect a transmitted DMRS sequence using correlation or another technique.

By enabling the UE 120 to indicate or control PUSCH DMRS bundling using an indication of whether the UE 120 was able to comply with a DMRS bundling request transmitted by the base station 110, techniques and apparatuses described herein can be used to provide an unambiguous indication of whether different PUSCH transmissions are phase coherent with one another. As a result, the base station 110 can correctly determine when to perform joint channel estimation for a PUSCH transmission using multiple DMRSs, thereby improving the accuracy of channel estimation, reducing communication errors, and improving demodulation of the PUSCH transmission. Furthermore, the techniques described herein allow the base station 110 to instruct a UE 120 regarding which uplink transmissions to apply DMRS bundling, while allowing the UE 120 to flexibly modify those instructions.

Figure 8:
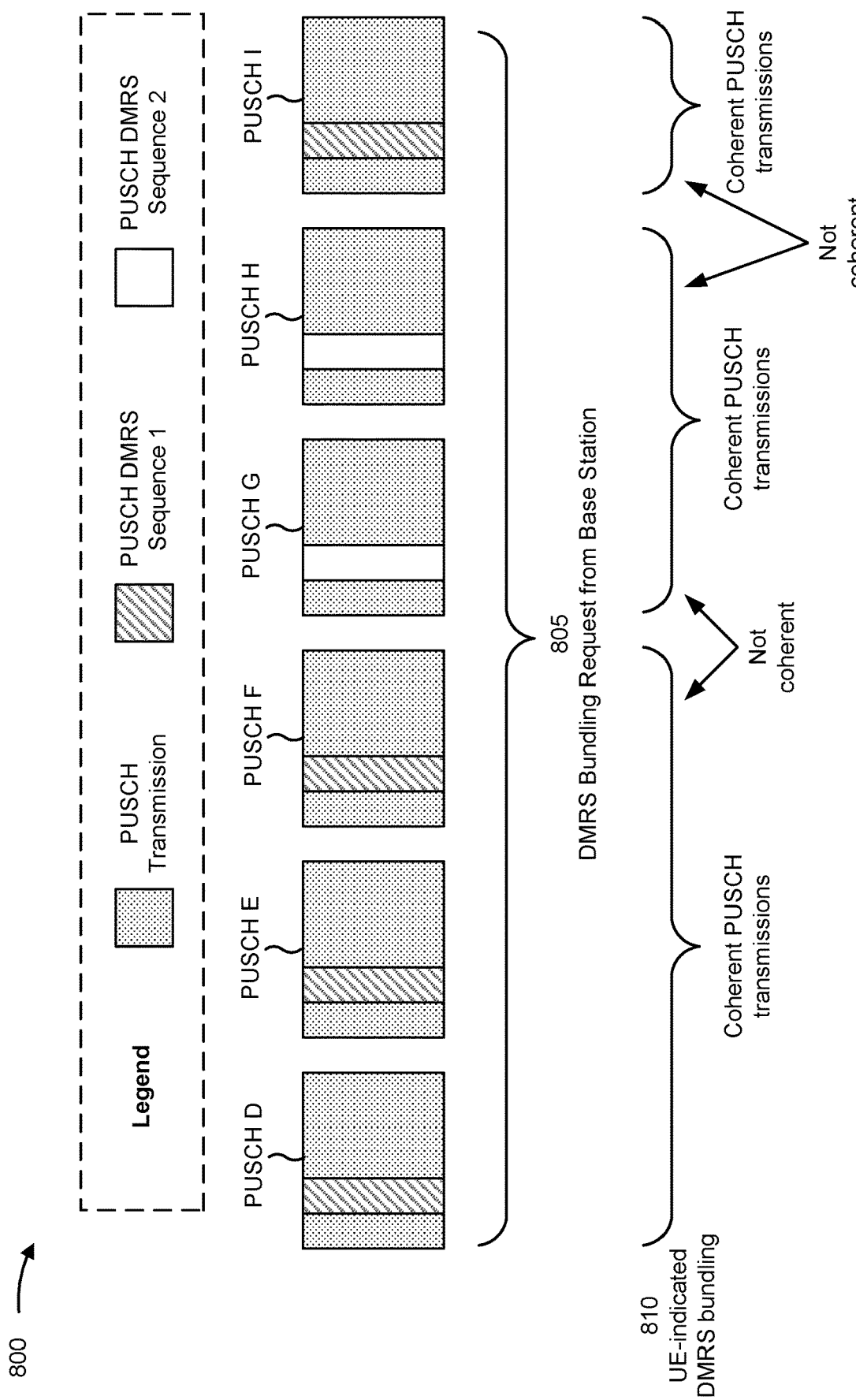

FIG. 8 is a diagram illustrating an example 800 associated with indicating whether DMRS bundling is applied by a UE in accordance with the present disclosure. Although example 800 is described in connection with PUSCH transmissions, the techniques described in connection with FIG. 8 may also be applied to PUCCH transmissions.

In an operation 805, a base station 110 may transmit, to a UE 120, a DMRS bundling request that indicates a set of PUSCH transmissions to which DMRS bundling is to be applied (for example, a set of PUSCH transmissions in a time period). In example 800, the set of PUSCH transmissions include PUSCH D, PUSCH E, PUSCH F, PUSCH G, PUSCH H, and PUSCH I. The base station 110 may request that the UE 120 apply DMRS bundling to all of these PUSCH transmissions. However, the UE 120 may be unable to comply with this request because the UE 120 may be unable to maintain phase coherence across all of these PUSCH transmissions.

In an operation 810, the UE 120 may transmit one or more indications of whether the UE 120 is able to comply with the request. For example, the UE 120 may transmit one or more indications of whether the UE 120 is able to maintain phase coherence across different PUSCH transmissions included in the set of PUSCH transmissions. In example 800, the UE 120 uses DMRS sequences to indicate whether the UE 120 is able to comply with the request.

For example, the UE 120 transmits the same DMRS sequence, shown as PUSCH DMRS Sequence 1, in connection with PUSCH D, PUSCH E, and PUSCH F. By transmitting the same DMRS sequence for PUSCH D, PUSCH E, and PUSCH F, the UE 120 indicates that PUSCH D, PUSCH E, and PUSCH are phase coherent with one another. The UE 120 then transmits a different DMRS sequence, shown as PUSCH DMRS Sequence 2, in connection with PUSCH G to indicate that PUSCH G is not phase coherent with PUSCH D, PUSCH E, and PUSCH F. The UE 120 then transmits PUSCH DMRS Sequence 2 again in connection with PUSCH H to indicate that PUSCH H is phase coherent with PUSCH G. The UE 120 then toggles back to DMRS Sequence 1 and transmits DMRS Sequence 1 in connection with PUSCH I to indicate that PUSCH I is not phase coherent with PUSCH H and PUSCH G. Furthermore, PUSCH I is not coherent with PUSCH D, PUSCH E, and PUSCH F.

In some aspects, rather than re-using PUSCH DMRS Sequence 1 for PUSCH I, the UE 120 may transmit a third DMRS sequence (for example, PUSCH DMRS Sequence 3) for PUSCH I to indicate that PUSCH I is not phase coherent with PUSCH G and PUSCH H. In this example, if the base station 110 fails to receive the DMRSs associated with PUSCH G and PUSCH H, the base station 110 will not incorrectly determine that PUSCH I is phase coherent with PUSCH D, PUSCH E, and PUSCH F.

Figure 9:
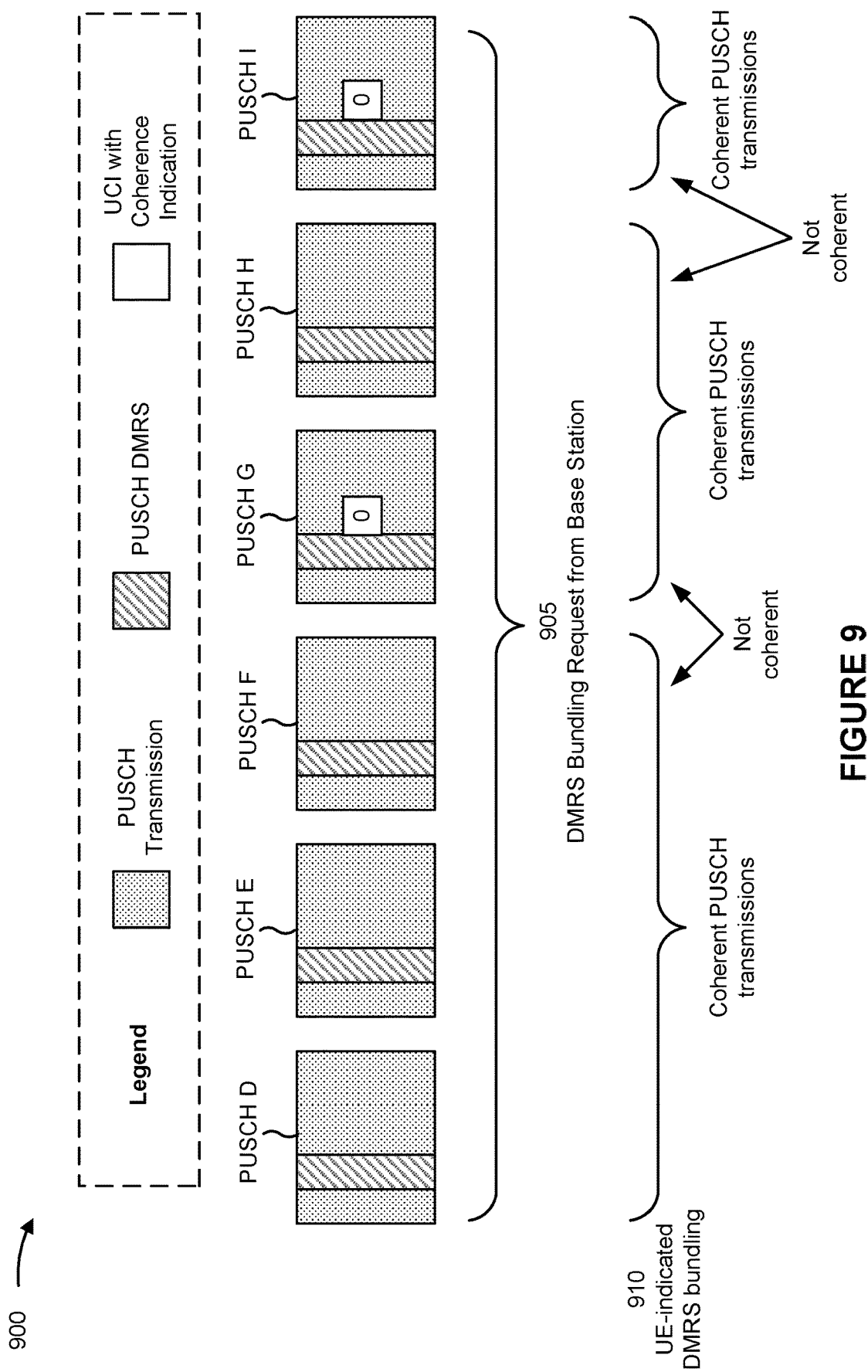

FIG. 9 is a diagram illustrating an example 900 associated with indicating whether DMRS bundling is applied by a UE in accordance with the present disclosure. In an operation 905, a base station 110 may transmit, to a UE 120, a DMRS bundling request that indicates a set of PUSCH transmissions to which DMRS bundling is to be applied (for example, a set of PUSCH transmissions in a time period). In example 900, the set of PUSCH transmissions include PUSCH D, PUSCH E, PUSCH F, PUSCH G, PUSCH H, and PUSCH I. The base station 110 may request that the UE 120 apply DMRS bundling to all of these PUSCH transmissions. However, the UE 120 may be unable to comply with this request because the UE 120 may be unable to maintain phase coherence across all of these PUSCH transmissions.

In an operation 910, the UE 120 may transmit one or more indications of whether the UE 120 is able to comply with the request. In example 900, the UE 120 transmits the indication of whether the UE 120 is able to comply with the request only if the UE 120 is not able to comply with the request (for example, only if the UE 120 is not able to maintain phase coherence). For example, if the UE 120 determines that the UE 120 is not able to maintain phase coherence between a primary uplink transmission and one or more secondary uplink transmissions (for example, a previous uplink transmission or a next uplink transmission), then the UE 120 transmits, in association with the primary uplink transmission (for example, in UCI multiplexed with the primary uplink transmission), an indication that the UE 120 is not able to maintain phase coherence for the primary uplink transmission. If the UE 120 determines that the UE 120 is able to maintain phase coherence between a primary uplink transmission and one or more secondary uplink transmissions (for example, a previous uplink transmission or a next uplink transmission), then the UE 120 refrains from transmitting, in association with the primary uplink transmission (for example, in UCI multiplexed with the primary uplink transmission), an explicit indication that the UE 120 is able to maintain phase coherence for the primary uplink transmission. If the explicit indication is not present for a primary uplink transmission, then this may implicitly indicate to the base station 110 that the UE 120 is able to maintain phase coherence for the primary uplink transmission, while reducing signaling overhead.

For example, the UE 120 transmits PUSCH D, PUSCH E, and PUSCH F without transmitting a coherence indication in UCI multiplexed with those PUSCH transmissions. By transmitting PUSCH D, PUSCH E, and PUSCH F without the coherence indication in corresponding UCI, the UE 120 indicates that PUSCH D, PUSCH E, and PUSCH are phase coherent with one another. The UE 120 then transmits UCI with a coherence indication (shown as having a value of 0) in connection with PUSCH G to indicate that PUSCH G is not phase coherent with PUSCH D, PUSCH E, and PUSCH F. The UE 120 then transmits PUSCH H without a coherence indication in UCI multiplexed with PUSCH H to indicate that PUSCH H is phase coherent with PUSCH G. The UE 120 then transmits UCI with a coherence indication (shown as having a value of 0) in connection with PUSCH I to indicate that PUSCH I is not phase coherent with PUSCH H and PUSCH G. Furthermore, PUSCH I is not coherent with PUSCH D, PUSCH E, and PUSCH F.

Figure 10:
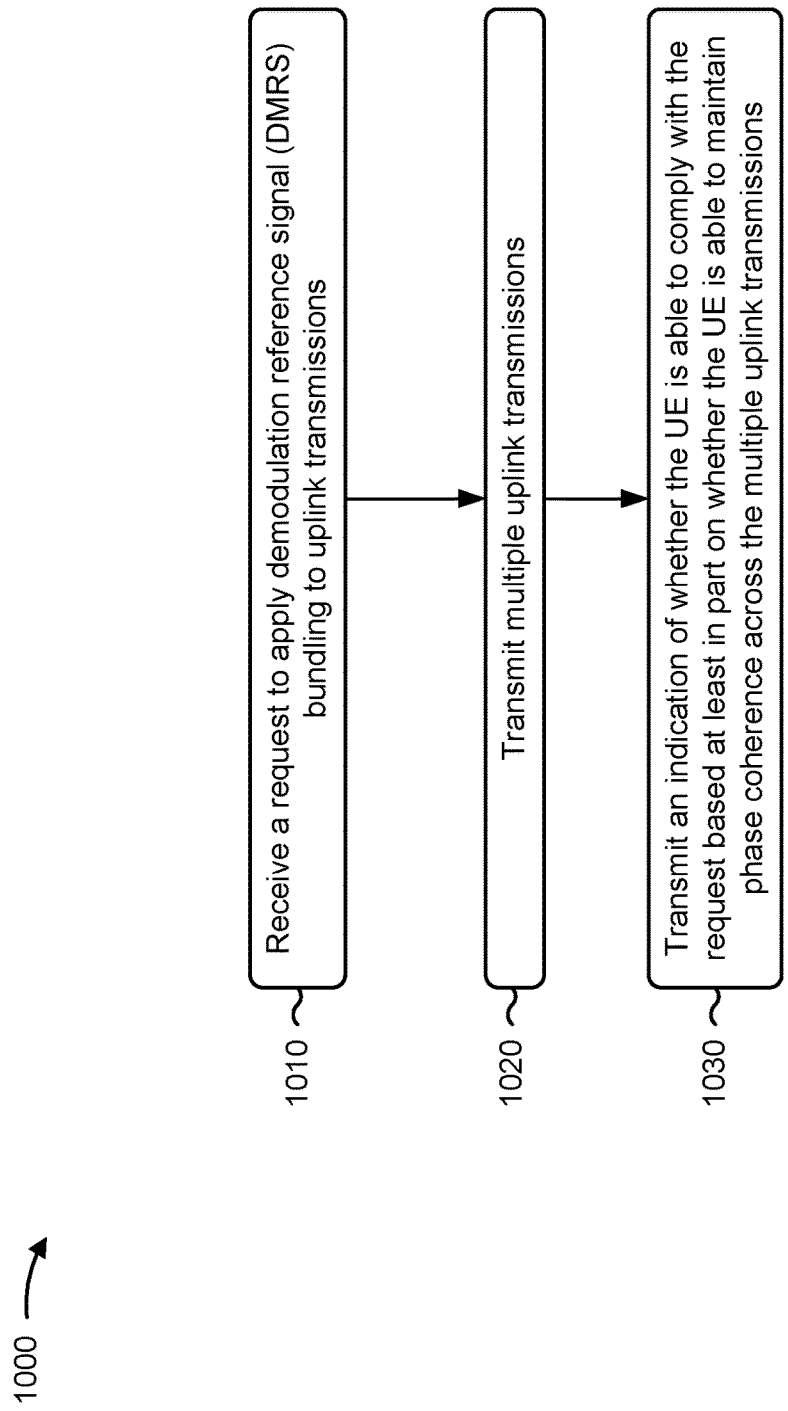
FIG. 10 is a flowchart illustrating an example process performed, for example, by a UE in accordance with the present disclosure.

FIG. 10 is a flowchart illustrating an example process 1000 performed, for example, by a UE in accordance with the present disclosure. Example process 1000 is an example where the UE (for example, UE 120) performs operations associated with indicating whether DMRS bundling is applied by a UE.

As shown in FIG. 10, in some aspects, process 1000 may include receiving a request to apply DMRS bundling to uplink transmissions (block 1010). For example, the UE (such as by using reception component 1202, depicted in FIG. 12) may receive a request to apply DMRS bundling to uplink transmissions, as described above. In some aspects, the UE may receive a request to apply DMRS bundling for an indicated time period. Additionally, or alternatively, the UE may receive a request to apply DMRS bundling by maintaining phase coherence across multiple uplink transmissions (e.g., to be transmitted during the indicated time period) to enable joint channel estimation across the multiple uplink transmissions As further shown in FIG. 10, in some aspects, process 1000 may include transmitting multiple uplink transmissions (block 1020). For example, the UE (such as by using transmission component 1206, depicted in FIG. 12) may transmit multiple uplink transmissions, as described above. In some aspects, the UE may transmit the multiple uplink transmissions during the indicated time period.

As further shown in FIG. 10, in some aspects, process 1000 may include transmitting an indication of whether the UE is able to comply with the request based at least in part on whether the UE is able to maintain phase coherence across the multiple uplink transmissions (block 1030). For example, the UE (such as by using transmission component 1206, depicted in FIG. 12) may transmit an indication of whether the UE is able to comply with the request based at least in part on whether the UE is able to maintain phase coherence across the multiple uplink transmissions, as described above. In some aspects, the UE may transmit an indication of whether the UE is able to comply with the request based at least in part on whether the UE is able to maintain phase coherence across the multiple uplink transmissions transmitted during the indicated time period.

Process 1000 may include additional aspects, such as any single aspect or any combination of aspects described below or in connection with one or more other processes described elsewhere herein.

In a first additional aspect, the multiple uplink transmissions are multiple PUSCH transmissions, and transmitting the indication of whether the UE is able to comply with the request comprises transmitting the indication in UCI that is multiplexed with a PUSCH transmission of the multiple PUSCH transmissions (e.g., transmitted during the indicated time period).

In a second additional aspect, alone or in combination with the first aspect, the indication of whether the UE is able to comply with the request consists of a single bit, in the UCI, that indicates whether the UE is able to maintain phase coherence across the PUSCH transmission and one or more other PUSCH transmissions included in the multiple PUSCH transmissions (e.g., transmitted during the indicated time period).

In a third additional aspect, alone or in combination with one or more of the first and second aspects, transmitting the indication of whether the UE is able to comply with the request comprises transmitting a particular DMRS sequence in association with an uplink transmission of the multiple uplink transmissions (e.g., transmitted during the indicated time period), wherein the particular DMRS sequence indicates whether the UE is able to maintain phase coherence across the uplink transmission and one or more other uplink transmissions included in the multiple uplink transmissions (e.g., transmitted during the indicated time period).

In a fourth additional aspect, alone or in combination with one or more of the first through third aspects, the particular DMRS sequence is one of a first DMRS sequence that indicates that the UE is able to maintain phase coherence across the uplink transmission and the one or more other uplink transmissions, or a second DMRS sequence that indicates that the UE is not able to maintain phase coherence across the uplink transmission and the one or more other uplink transmissions.

In a fifth additional aspect, alone or in combination with one or more of the first through fourth aspects, process 1000 includes determining the particular DMRS sequence based at least in part on a formula, for a sequence initialization seed, that includes a parameter that represents whether the UE is able to maintain phase coherence across the uplink transmission and the one or more other uplink transmissions.

In a sixth additional aspect, alone or in combination with one or more of the first through fifth aspects, transmitting the particular DMRS sequence in association with the uplink transmission comprises one of transmitting a same DMRS sequence, in association with the uplink transmission, as a DMRS sequence used for the one or more other uplink transmissions to indicate that the UE is able to maintain phase coherence across the uplink transmission and the one or more other uplink transmissions, or transmitting a different DMRS sequence, in association with the uplink transmission, than a DMRS sequence used for the one or more other uplink transmissions to indicate that the UE is not able to maintain phase coherence across the uplink transmission and the one or more other uplink transmissions.

In a seventh additional aspect, alone or in combination with one or more of the first through sixth aspects, process 1000 includes selecting the particular DMRS sequence from a pool of DMRS sequences that includes at least three DMRS sequences, wherein the different DMRS sequence is selected as a next DMRS sequence in the pool.

In an eighth additional aspect, alone or in combination with one or more of the first through seventh aspects, transmitting the indication of whether the UE is able to comply with the request comprises transmitting the indication using a particular DMRS port, wherein the particular DMRS port indicates whether the UE is able to maintain phase coherence across an uplink transmission, of the multiple uplink transmissions (e.g., transmitted during the indicated time period), and one or more other uplink transmissions included in the multiple uplink transmissions (e.g., transmitted during the indicated time period).

In a ninth additional aspect, alone or in combination with one or more of the first through eighth aspects, the indication is transmitted in association with every uplink transmission included in the multiple uplink transmissions (e.g., transmitted during the indicated time period).

In a tenth additional aspect, alone or in combination with one or more of the first through ninth aspects, transmitting the indication of whether the UE is able to comply with the request comprises transmitting the indication based at least in part on a determination that the UE is not able to maintain phase coherence across an uplink transmission, of the multiple uplink transmissions (e.g., transmitted during the indicated time period), and one or more other uplink transmissions included in the multiple uplink transmissions (e.g., transmitted during the indicated time period).

In an eleventh additional aspect, alone or in combination with one or more of the first through tenth aspects, the indication is not transmitted in association with a particular uplink transmission, included in the multiple uplink transmissions, based at least in part on a determination that the UE is able to maintain phase coherence across the particular uplink transmission and at least one other uplink transmission included in the multiple uplink transmissions (e.g., transmitted during the indicated time period).

In a twelfth additional aspect, alone or in combination with one or more of the first through eleventh aspects, the multiple uplink transmissions are multiple physical uplink shared channel transmissions or are multiple physical uplink control channel transmissions.

In a thirteenth additional aspect, alone or in combination with one or more of the first through twelfth aspects, receiving the request to apply the DMRS bundling comprises receiving the request in dedicated downlink control information (DCI), a physical uplink shared channel grant, a physical downlink shared channel grant, or a radio resource control message.

In a fourteenth additional aspect, alone or in combination with one or more of the first through thirteenth aspects, the request indicates a time period during which the DMRS bundling is to be applied, and the multiple uplink transmissions are transmitted during the time period.

In a fifteenth additional aspect, alone or in combination with one or more of the first through fourteenth aspects, the time period is indicated as at least one of an absolute time period, a quantity of slots, or a quantity of uplink transmissions.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
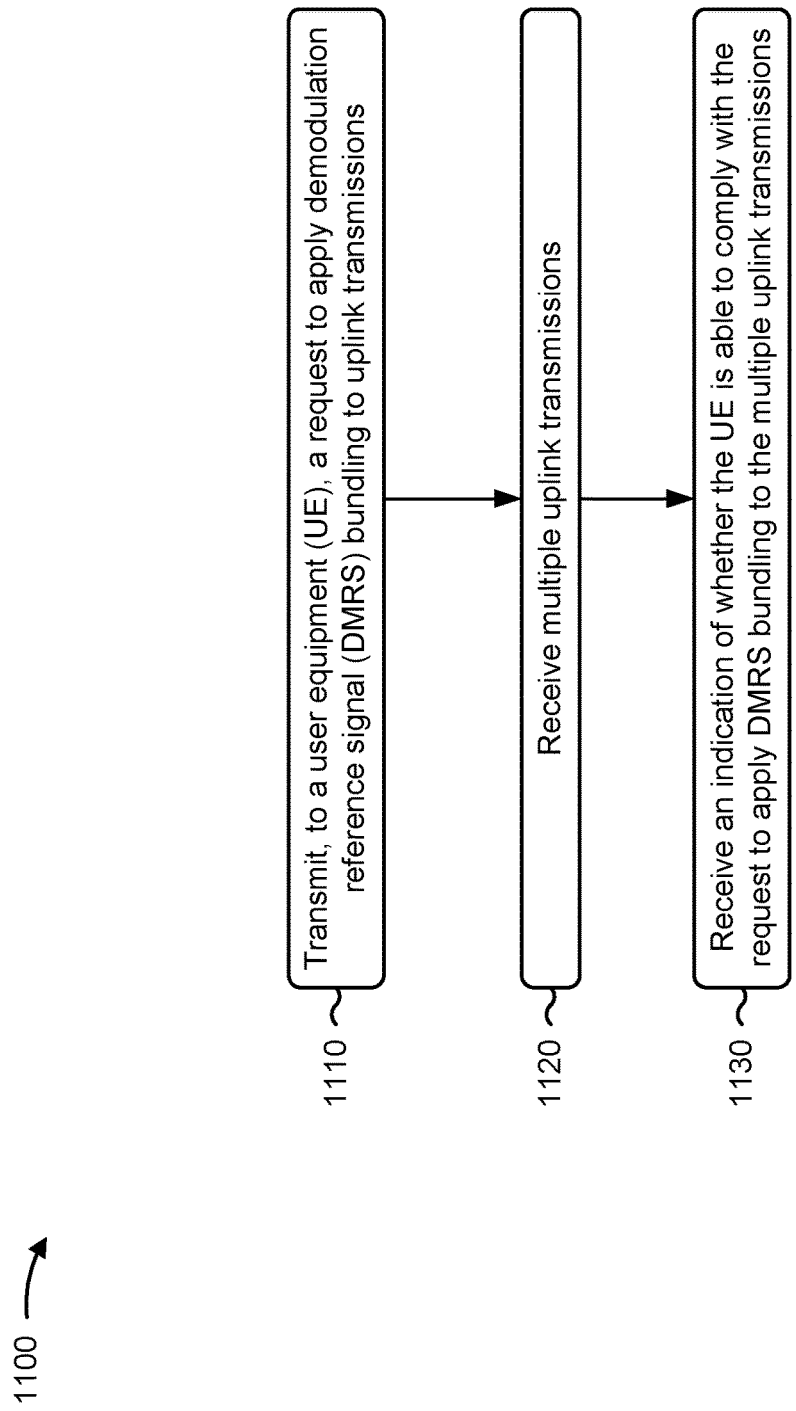
FIG. 11 is a flowchart illustrating an example process performed, for example, by a base station in accordance with the present disclosure.

FIG. 11 is a flowchart illustrating an example process 1100 performed, for example, by a network entity (e.g., a base station or another network entity) in accordance with the present disclosure. Example process 1100 is an example where the network entity (for example, base station 110) performs operations associated with indicating whether DMRS bundling is applied by a UE.

As shown in FIG. 11, in some aspects, process 1100 may include transmitting, to a UE, a request to apply DMRS bundling to uplink transmissions (block 1110). For example, the network entity (such as by using transmission component 1306, depicted in FIG. 13) may transmit, to a UE, a request to apply DMRS bundling to uplink transmissions, as described above. In some aspects, the network entity may transmit a request to apply DMRS bundling to uplink transmissions to enable the network entity to perform joint channel estimation across multiple uplink transmissions scheduled for the UE during a time period indicated in the request.

As further shown in FIG. 11, in some aspects, process 1100 may include receiving multiple uplink transmissions (block 1120). For example, the network entity (such as by using reception component 1302, depicted in FIG. 13) may receive multiple uplink transmissions, as described above. In some aspects, the network entity may receive the multiple uplink transmissions during the indicated time period.

As further shown in FIG. 11, in some aspects, process 1100 may include receiving an indication of whether the UE is able to comply with the request to apply DMRS bundling to the multiple uplink transmissions (block 1130). For example, the network entity (such as by using reception component 1302, depicted in FIG. 13) may receive an indication of whether the UE is able to comply with the request to apply DMRS bundling to the multiple uplink transmissions, as described above. In some aspects, the network entity may receive an indication of whether the UE is able to comply with the request to apply DMRS bundling to the multiple uplink transmissions received during the time period.

Process 1100 may include additional aspects, such as any single aspect or any combination of aspects described below or in connection with one or more other processes described elsewhere herein.

In a first additional aspect, the indication of whether the UE is able to comply with the request indicates whether the UE is able to maintain phase coherence across the multiple uplink transmissions (e.g., transmitted during the time period).

In a second additional aspect, alone or in combination with the first aspect, process 1100 includes performing joint channel estimation across all of the multiple uplink transmissions or a subset of the multiple uplink transmissions based at least in part on the indication of whether the UE is able to comply with the request.

In a third additional aspect, alone or in combination with one or more of the first and second aspects, process 1100 includes identifying a subset of the multiple uplink transmissions to which joint channel estimation is to be applied based at least in part on the indication of whether the UE is able to comply with the request, and performing joint channel estimation across the subset of the multiple uplink transmissions.

In a fourth additional aspect, alone or in combination with one or more of the first through third aspects, the multiple uplink transmissions are multiple PUSCH transmissions, and receiving the indication of whether the UE is able to comply with the request comprises receiving the indication in UCI that is multiplexed with a PUSCH transmission of the multiple PUSCH transmissions (e.g., transmitted during the indicated time period).

In a fifth additional aspect, alone or in combination with one or more of the first through fourth aspects, the indication of whether the UE is able to comply with the request consists of a single bit, in the UCI, that indicates whether the UE is able to maintain phase coherence across the PUSCH transmission and one or more other PUSCH transmissions included in the multiple PUSCH transmissions (e.g., transmitted during the indicated time period).

In a sixth additional aspect, alone or in combination with one or more of the first through fifth aspects, receiving the indication of whether the UE is able to comply with the request comprises receiving a particular DMRS sequence in association with an uplink transmission of the multiple uplink transmissions (e.g., transmitted during the indicated time period), wherein the particular DMRS sequence indicates whether the UE is able to maintain phase coherence across the uplink transmission and one or more other uplink transmissions included in the multiple uplink transmissions (e.g., transmitted during the indicated time period).

In a seventh additional aspect, alone or in combination with one or more of the first through sixth aspects, the particular DMRS sequence is one of a first DMRS sequence that indicates that the UE is able to maintain phase coherence across the uplink transmission and the one or more other uplink transmissions, or a second DMRS sequence that indicates that the UE is not able to maintain phase coherence across the uplink transmission and the one or more other uplink transmissions.

In an eighth additional aspect, alone or in combination with one or more of the first through seventh aspects, receiving the particular DMRS sequence in association with the uplink transmission comprises one of receiving a same DMRS sequence, in association with the uplink transmission, as a DMRS sequence used for the one or more other uplink transmissions to indicate that the UE is able to maintain phase coherence across the uplink transmission and the one or more other uplink transmissions, or receiving a different DMRS sequence, in association with the uplink transmission, than a DMRS sequence used for the one or more other uplink transmissions to indicate that the UE is not able to maintain phase coherence across the uplink transmission and the one or more other uplink transmissions.

In a ninth additional aspect, alone or in combination with one or more of the first through eighth aspects, receiving the indication of whether the UE is able to comply with the request comprises receiving the indication using a particular DMRS port, wherein the particular DMRS port indicates whether the UE is able to maintain phase coherence across an uplink transmission, of the multiple uplink transmissions (e.g., transmitted during the indicated time period), and one or more other uplink transmissions included in the multiple uplink transmissions (e.g., transmitted during the indicated time period).

In a tenth additional aspect, alone or in combination with one or more of the first through ninth aspects, the indication is received in association with every uplink transmission included in the multiple uplink transmissions (e.g., transmitted during the indicated time period).

In an eleventh additional aspect, alone or in combination with one or more of the first through tenth aspects, the multiple uplink transmissions are multiple physical uplink shared channel transmissions or are multiple physical uplink control channel transmissions.

In a twelfth additional aspect, alone or in combination with one or more of the first through eleventh aspects, transmitting the request to apply the DMRS bundling comprises transmitting the request in dedicated downlink control information (DCI), a physical uplink shared channel grant, a physical downlink shared channel grant, or a radio resource control message.

In a thirteenth additional aspect, alone or in combination with one or more of the first through twelfth aspects, the request indicates a time period during which the DMRS bundling is to be applied, and the multiple uplink transmissions are transmitted during the time period.

In a fourteenth additional aspect, alone or in combination with one or more of the first through thirteenth aspects, the time period is indicated as at least one of an absolute time period, a quantity of slots, or a quantity of uplink transmissions.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
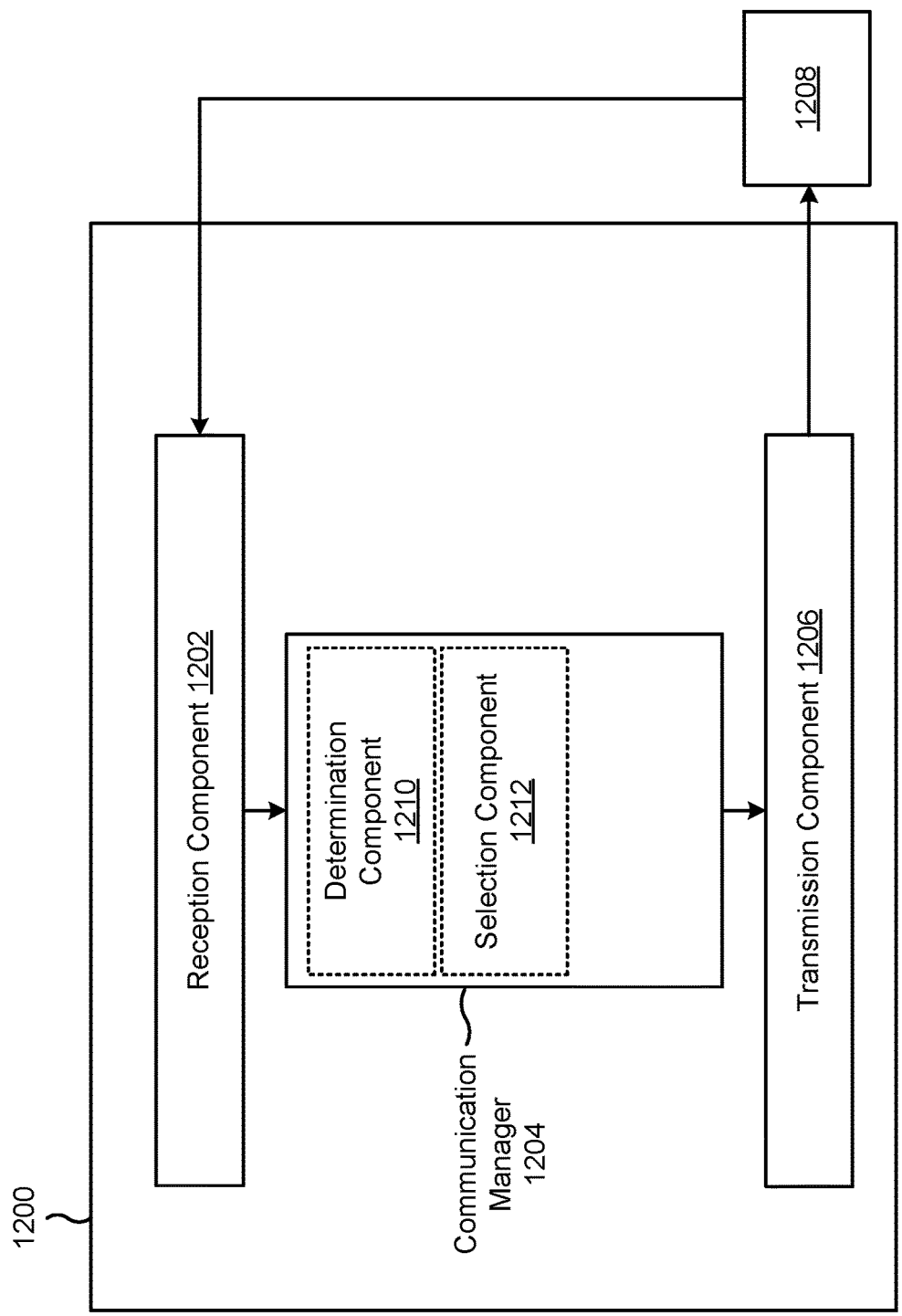
FIGS. 12 and 13 are block diagrams of example apparatuses for wireless communication in accordance with the present disclosure.

FIG. 12 is a block diagram of an example apparatus 1200 for wireless communication in accordance with the present disclosure. The apparatus 1200 may be a UE, or a UE may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a network entity, a base station, or another wireless communication device) using the reception component 1202 and the transmission component 1206.

In some aspects, the apparatus 1200 may be configured to perform one or more operations described herein in connection with FIGS. 6-8. Additionally or alternatively, the apparatus 1200 may be configured to perform one or more processes described herein, such as process 1000 of FIG. 10. In some aspects, the apparatus 1200 may include one or more components of the UE described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the UE described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the UE described above in connection with FIG. 2. In some aspects, the transmission component 1206 may be co-located with the reception component 1202 in a transceiver.

The communication manager 1204 may receive or may cause the reception component 1202 to receive a request to apply DMRS bundling to uplink transmissions. The communication manager 1204 may transmit or may cause the transmission component 1206 to transmit multiple uplink transmissions. The communication manager 1204 may transmit or may cause the transmission component 1206 to transmit an indication of whether the UE is able to comply with the request based at least in part on whether the UE is able to maintain phase coherence across the multiple uplink transmissions. In some aspects, the communication manager 1204 may perform one or more operations described elsewhere herein as being performed by one or more components of the communication manager 1204.

The communication manager 1204 may include a controller/processor, a memory, or a combination thereof, of the UE described above in connection with FIG. 2. In some aspects, the communication manager 1204 includes a set of components, such as a determination component 1210, a selection component 1212, or a combination thereof. Alternatively, the set of components may be separate and distinct from the communication manager 1204. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive a request to apply DMRS bundling to uplink transmissions. The transmission component 1206 may transmit multiple uplink transmissions. The transmission component 1206 may transmit an indication of whether the UE is able to comply with the request based at least in part on whether the UE is able to maintain phase coherence across the multiple uplink transmissions transmitted.

The determination component 1210 may determine a particular DMRS sequence based at least in part on a formula, for a sequence initialization seed, that includes a parameter that represents whether the UE is able to maintain phase coherence across the uplink transmission and the one or more other uplink transmissions. The selection component 1212 may select a particular DMRS sequence from a pool of DMRS sequences that includes at least three DMRS sequences, wherein the different DMRS sequence is selected as a next DMRS sequence in the pool.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
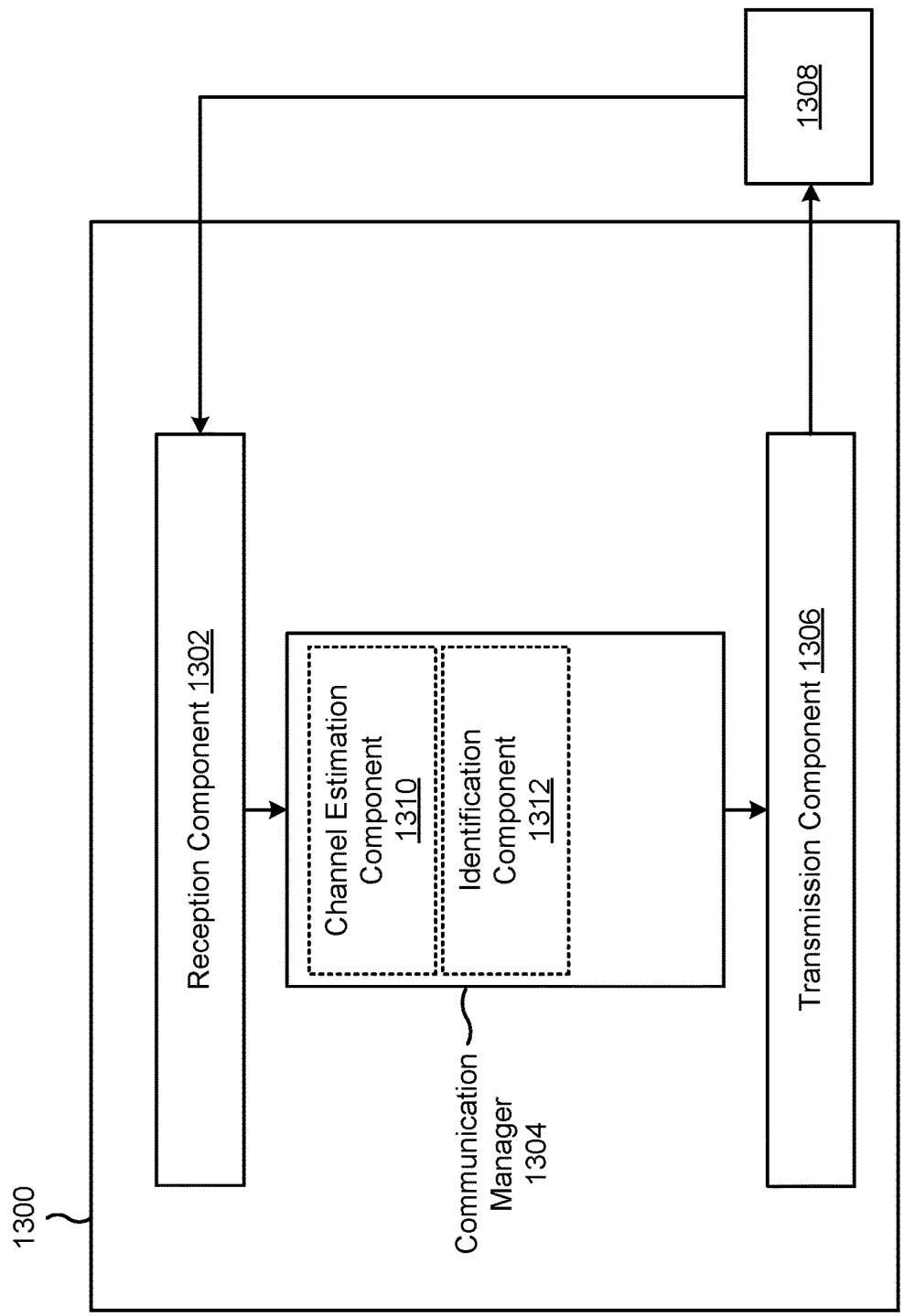

FIG. 13 is a block diagram of an example apparatus 1300 for wireless communication in accordance with the present disclosure. The apparatus 1300 may be a network entity (such as a base station), or a network entity may include the apparatus 1300. In some aspects, the apparatus 1300 includes a reception component 1302, a communication manager 1304, and a transmission component 1306, which may be in communication with one another (for example, via one or more buses). As shown, the apparatus 1300 may communicate with another apparatus 1308 (such as a UE, a network entity, a base station, or another wireless communication device) using the reception component 1302 and the transmission component 1306.

In some aspects, the apparatus 1300 may be configured to perform one or more operations described herein in connection with FIGS. 6-8. Additionally or alternatively, the apparatus 1300 may be configured to perform one or more processes described herein, such as process 1100 of FIG. 11. In some aspects, the apparatus 1300 may include one or more components of the base station described above in connection with FIG. 2.

The reception component 1302 may receive communications, such as reference signals, control information, data communications, or a combination thereof, from the apparatus 1308. The reception component 1302 may provide received communications to one or more other components of the apparatus 1300, such as the communication manager 1304. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a demodulator, a MIMO detector, a receive processor, a controller/processor, a memory, or a combination thereof, of the base station described above in connection with FIG. 2.

The transmission component 1306 may transmit communications, such as reference signals, control information, data communications, or a combination thereof, to the apparatus 1308. In some aspects, the communication manager 1304 may generate communications and may transmit the generated communications to the transmission component 1306 for transmission to the apparatus 1308. In some aspects, the transmission component 1306 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1306 may include one or more antennas, a modulator, a transmit MIMO processor, a transmit processor, a controller/processor, a memory, or a combination thereof, of the base station described above in connection with FIG. 2. In some aspects, the transmission component 1306 may be co-located with the reception component 1302 in a transceiver.

The communication manager 1304 may transmit or may cause the transmission component 1306 to transmit a request to apply DMRS bundling to uplink transmissions. The communication manager 1304 may receive or may cause the reception component 1302 to receive multiple uplink transmissions. The communication manager 1304 may receive or may cause the reception component 1302 to receive an indication of whether the UE is able to comply with the request to apply DMRS bundling to the multiple uplink transmissions. In some aspects, the communication manager 1304 may perform one or more operations described elsewhere herein as being performed by one or more components of the communication manager 1304.

The communication manager 1304 may include a controller/processor, a memory, a scheduler, a communication unit, or a combination thereof, of the base station described above in connection with FIG. 2. In some aspects, the communication manager 1304 includes a set of components, such as a channel estimation component 1310, an identification component 1312, or a combination thereof. Alternatively, the set of components may be separate and distinct from the communication manager 1304. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1306 may transmit a request to apply DMRS bundling to uplink transmissions. The reception component 1302 may receive multiple uplink transmissions. The reception component 1302 may receive an indication of whether the UE is able to comply with the request to apply DMRS bundling to the multiple uplink transmissions.

The channel estimation component 1310 may perform joint channel estimation across all of the multiple uplink transmissions or a subset of the multiple uplink transmissions based at least in part on the indication of whether the UE is able to comply with the request. The identification component 1312 may identify a subset of the multiple uplink transmissions to which joint channel estimation is to be applied based at least in part on the indication of whether the UE is able to comply with the request. The channel estimation component 1310 may perform joint channel estimation across the subset of the multiple uplink transmissions.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving a request to apply demodulation reference signal (DMRS) bundling to uplink transmissions for an indicated time period by maintaining phase coherence across multiple uplink transmissions, to be transmitted during the indicated time period, to enable joint channel estimation across the multiple uplink transmissions; transmitting the multiple uplink transmissions during the indicated time period; and transmitting an indication of whether the UE is able to comply with the request based at least in part on whether the UE is able to maintain phase coherence across the multiple uplink transmissions transmitted during the indicated time period.

Aspect 2: The method of Aspect 1, wherein the multiple uplink transmissions are multiple physical uplink shared channel (PUSCH) transmissions; and wherein transmitting the indication of whether the UE is able to comply with the request comprises transmitting the indication in uplink control information (UCI) that is multiplexed with a PUSCH transmission of the multiple PUSCH transmissions transmitted during the indicated time period.

Aspect 3: The method of Aspect 2, wherein the indication of whether the UE is able to comply with the request consists of a single bit, in the UCI, that indicates whether the UE is able to maintain phase coherence across the PUSCH transmission and one or more other PUSCH transmissions included in the multiple PUSCH transmissions transmitted during the indicated time period.

Aspect 4: The method of Aspect 1, wherein transmitting the indication of whether the UE is able to comply with the request comprises transmitting a particular DMRS sequence in association with an uplink transmission of the multiple uplink transmissions transmitted during the indicated time period, wherein the particular DMRS sequence indicates whether the UE is able to maintain phase coherence across the uplink transmission and one or more other uplink transmissions included in the multiple uplink transmissions transmitted during the indicated time period.

Aspect 5: The method of Aspect 4, wherein the particular DMRS sequence is one of: a first DMRS sequence that indicates that the UE is able to maintain phase coherence across the uplink transmission and the one or more other uplink transmissions, or a second DMRS sequence that indicates that the UE is not able to maintain phase coherence across the uplink transmission and the one or more other uplink transmissions.

Aspect 6: The method of any of Aspects 4-5, further comprising determining the particular DMRS sequence based at least in part on a formula, for a sequence initialization seed, that includes a parameter that represents whether the UE is able to maintain phase coherence across the uplink transmission and the one or more other uplink transmissions.

Aspect 7: The method of any of Aspects 4-6, wherein transmitting the particular DMRS sequence in association with the uplink transmission comprises one of: transmitting a same DMRS sequence, in association with the uplink transmission, as a DMRS sequence used for the one or more other uplink transmissions to indicate that the UE is able to maintain phase coherence across the uplink transmission and the one or more other uplink transmissions, or transmitting a different DMRS sequence, in association with the uplink transmission, than a DMRS sequence used for the one or more other uplink transmissions to indicate that the UE is not able to maintain phase coherence across the uplink transmission and the one or more other uplink transmissions.

Aspect 8: The method of Aspect 7, further comprising selecting the particular DMRS sequence from a pool of DMRS sequences that includes at least three DMRS sequences, wherein the different DMRS sequence is selected as a next DMRS sequence in the pool.

Aspect 9: The method of Aspect 1, wherein transmitting the indication of whether the UE is able to comply with the request comprises transmitting the indication using a particular DMRS port, wherein the particular DMRS port indicates whether the UE is able to maintain phase coherence across an uplink transmission, of the multiple uplink transmissions transmitted during the indicated time period, and one or more other uplink transmissions included in the multiple uplink transmissions transmitted during the indicated time period.

Aspect 10: The method of any of Aspects 1-9, wherein the indication is transmitted in association with every uplink transmission included in the multiple uplink transmissions transmitted during the indicated time period.

Aspect 11: The method of any of Aspects 1-9, wherein transmitting the indication of whether the UE is able to comply with the request comprises transmitting the indication based at least in part on a determination that the UE is not able to maintain phase coherence across an uplink transmission, of the multiple uplink transmissions transmitted during the indicated time period, and one or more other uplink transmissions included in the multiple uplink transmissions transmitted during the indicated time period.

Aspect 12: The method of Aspect 11, wherein the indication is not transmitted in association with a particular uplink transmission, included in the multiple uplink transmissions, based at least in part on a determination that the UE is able to maintain phase coherence across the particular uplink transmission and at least one other uplink transmission included in the multiple uplink transmissions transmitted during the indicated time period.

Aspect 13: The method of any of Aspects 1-12, wherein the multiple uplink transmissions are multiple physical uplink shared channel transmissions or are multiple physical uplink control channel transmissions.

Aspect 14: The method of any of Aspects 1-13, wherein receiving the request to apply the DMRS bundling comprises receiving the request in dedicated downlink control information (DCI), a physical uplink shared channel grant, a physical downlink shared channel grant, or a radio resource control message.

Aspect 15: The method of any of Aspects 1-14, wherein the indicated time period is indicated as at least one of an absolute time period, a quantity of slots, or a quantity of uplink transmissions.

Aspect 16: A method of wireless communication performed by a network entity, comprising: transmitting, to a user equipment (UE), a request to apply demodulation reference signal (DMRS) bundling to uplink transmissions to enable the network entity to perform joint channel estimation across multiple uplink transmissions scheduled for the UE during a time period indicated in the request; receiving the multiple uplink transmissions during the indicated time period; and receiving an indication of whether the UE is able to comply with the request to apply DMRS bundling to the multiple uplink transmissions received during the time period.

Aspect 17: The method of Aspect 16, wherein the indication of whether the UE is able to comply with the request indicates whether the UE is able to maintain phase coherence across the multiple uplink transmissions transmitted during the time period.

Aspect 18: The method of any of Aspects 16-17, further comprising performing joint channel estimation across all of the multiple uplink transmissions or a subset of the multiple uplink transmissions based at least in part on the indication of whether the UE is able to comply with the request.

Aspect 19: The method of any of Aspects 16-18, further comprising: identifying a subset of the multiple uplink transmissions to which joint channel estimation is to be applied based at least in part on the indication of whether the UE is able to comply with the request; and performing joint channel estimation across the subset of the multiple uplink transmissions.

Aspect 20: The method of any of Aspects 16-19, wherein the multiple uplink transmissions are multiple physical uplink shared channel (PUSCH) transmissions; and wherein receiving the indication of whether the UE is able to comply with the request comprises receiving the indication in uplink control information (UCI) that is multiplexed with a PUSCH transmission of the multiple PUSCH transmissions transmitted during the indicated time period.

Aspect 21: The method of Aspect 20, wherein the indication of whether the UE is able to comply with the request consists of a single bit, in the UCI, that indicates whether the UE is able to maintain phase coherence across the PUSCH transmission and one or more other PUSCH transmissions included in the multiple PUSCH transmissions transmitted during the indicated time period.

Aspect 22: The method of any of Aspects 16-19, wherein receiving the indication of whether the UE is able to comply with the request comprises receiving a particular DMRS sequence in association with an uplink transmission of the multiple uplink transmissions transmitted during the indicated time period, wherein the particular DMRS sequence indicates whether the UE is able to maintain phase coherence across the uplink transmission and one or more other uplink transmissions included in the multiple uplink transmissions transmitted during the indicated time period.

Aspect 23: The method of Aspect 22, wherein the particular DMRS sequence is one of: a first DMRS sequence that indicates that the UE is able to maintain phase coherence across the uplink transmission and the one or more other uplink transmissions, or a second DMRS sequence that indicates that the UE is not able to maintain phase coherence across the uplink transmission and the one or more other uplink transmissions.

Aspect 24: The method of any of Aspects 22-23, wherein receiving the particular DMRS sequence in association with the uplink transmission comprises one of: receiving a same DMRS sequence, in association with the uplink transmission, as a DMRS sequence used for the one or more other uplink transmissions to indicate that the UE is able to maintain phase coherence across the uplink transmission and the one or more other uplink transmissions, or receiving a different DMRS sequence, in association with the uplink transmission, than a DMRS sequence used for the one or more other uplink transmissions to indicate that the UE is not able to maintain phase coherence across the uplink transmission and the one or more other uplink transmissions.

Aspect 25: The method of any of Aspects 16-19, wherein receiving the indication of whether the UE is able to comply with the request comprises receiving the indication using a particular DMRS port, wherein the particular DMRS port indicates whether the UE is able to maintain phase coherence across an uplink transmission, of the multiple uplink transmissions transmitted during the indicated time period, and one or more other uplink transmissions included in the multiple uplink transmissions transmitted during the indicated time period.

Aspect 26: The method of any of Aspects 16-25, wherein the indication is received in association with every uplink transmission included in the multiple uplink transmissions transmitted during the indicated time period.

Aspect 27: The method of any of Aspects 16-26, wherein the multiple uplink transmissions are multiple physical uplink shared channel transmissions or are multiple physical uplink control channel transmissions.

Aspect 28: The method of any of Aspects 16-27, wherein transmitting the request to apply the DMRS bundling comprises transmitting the request in dedicated downlink control information (DCI), a physical uplink shared channel grant, a physical downlink shared channel grant, or a radio resource control message.

Aspect 29: The method of any of Aspects 16-28, wherein the indicated time period is indicated as at least one of an absolute time period, a quantity of slots, or a quantity of uplink transmissions.

Aspect 30: An apparatus for wireless communication at a device, comprising a processor; memory coupled with the processor; and instructions stored in the memory and executable by the processor to cause the apparatus to perform the method of one or more Aspects of Aspects 1-15.

Aspect 31: A device for wireless communication, comprising a memory and one or more processors coupled to the memory, the memory and the one or more processors configured to perform the method of one or more Aspects of Aspects 1-15.

Aspect 32: An apparatus for wireless communication, comprising at least one means for performing the method of one or more Aspects of Aspects 1-15.

Aspect 33: A non-transitory computer-readable medium storing code for wireless communication, the code comprising instructions executable by a processor to perform the method of one or more Aspects of Aspects 1-15.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 1-15.

Aspect 35: An apparatus for wireless communication at a device, comprising a processor; memory coupled with the processor; and instructions stored in the memory and executable by the processor to cause the apparatus to perform the method of one or more Aspects of Aspects 16-29.

Aspect 36: A device for wireless communication, comprising a memory and one or more processors coupled to the memory, the memory and the one or more processors configured to perform the method of one or more Aspects of Aspects 16-29.

Aspect 37: An apparatus for wireless communication, comprising at least one means for performing the method of one or more Aspects of Aspects 16-29.

Aspect 38: A non-transitory computer-readable medium storing code for wireless communication, the code comprising instructions executable by a processor to perform the method of one or more Aspects of Aspects 16-29.

Aspect 39: A non-transitory computer-readable medium storing a set of instructions for wireless communication, the set of instructions comprising one or more instructions that, when executed by one or more processors of a device, cause the device to perform the method of one or more Aspects of Aspects 16-29.

Aspect 40: A method of wireless communication performed by a user equipment (UE), comprising: receiving a request to apply demodulation reference signal (DMRS) bundling to uplink transmissions; transmitting multiple uplink transmissions; and transmitting an indication of whether the UE is able to comply with the request based at least in part on whether the UE is able to maintain phase coherence across the multiple uplink transmissions.

Aspect 41: The method of Aspect 40, wherein the multiple uplink transmissions are multiple physical uplink shared channel (PUSCH) transmissions; and wherein transmitting the indication of whether the UE is able to comply with the request comprises transmitting the indication in uplink control information (UCI) that is multiplexed with a PUSCH transmission of the multiple PUSCH transmissions.

Aspect 42: The method of Aspect 41, wherein the indication of whether the UE is able to comply with the request consists of a single bit, in the UCI, that indicates whether the UE is able to maintain phase coherence across the PUSCH transmission and one or more other PUSCH transmissions included in the multiple PUSCH transmissions.

Aspect 43: The method of Aspect 40, wherein transmitting the indication of whether the UE is able to comply with the request comprises transmitting a particular DMRS sequence in association with an uplink transmission of the multiple uplink transmissions, wherein the particular DMRS sequence indicates whether the UE is able to maintain phase coherence across the uplink transmission and one or more other uplink transmissions included in the multiple uplink transmissions.

Aspect 44: The method of Aspect 43, wherein the particular DMRS sequence is one of: a first DMRS sequence that indicates that the UE is able to maintain phase coherence across the uplink transmission and the one or more other uplink transmissions, or a second DMRS sequence that indicates that the UE is not able to maintain phase coherence across the uplink transmission and the one or more other uplink transmissions.

Aspect 45: The method of any of Aspects 43-44, further comprising determining the particular DMRS sequence based at least in part on a formula, for a sequence initialization seed, that includes a parameter that represents whether the UE is able to maintain phase coherence across the uplink transmission and the one or more other uplink transmissions.

Aspect 46: The method of any of Aspects 43-45, wherein transmitting the particular DMRS sequence in association with the uplink transmission comprises one of: transmitting a same DMRS sequence, in association with the uplink transmission, as a DMRS sequence used for the one or more other uplink transmissions to indicate that the UE is able to maintain phase coherence across the uplink transmission and the one or more other uplink transmissions, or transmitting a different DMRS sequence, in association with the uplink transmission, than a DMRS sequence used for the one or more other uplink transmissions to indicate that the UE is not able to maintain phase coherence across the uplink transmission and the one or more other uplink transmissions.

Aspect 47: The method of Aspect 46, further comprising selecting the particular DMRS sequence from a pool of DMRS sequences that includes at least three DMRS sequences, wherein the different DMRS sequence is selected as a next DMRS sequence in the pool.

Aspect 48: The method of Aspect 40, wherein transmitting the indication of whether the UE is able to comply with the request comprises transmitting the indication using a particular DMRS port, wherein the particular DMRS port indicates whether the UE is able to maintain phase coherence across an uplink transmission, of the multiple uplink transmissions, and one or more other uplink transmissions included in the multiple uplink transmissions.

Aspect 49: The method of any of Aspects 40-48, wherein the indication is transmitted in association with every uplink transmission included in the multiple uplink transmissions.

Aspect 50: The method of any of Aspects 40-48, wherein transmitting the indication of whether the UE is able to comply with the request comprises transmitting the indication based at least in part on a determination that the UE is not able to maintain phase coherence across an uplink transmission, of the multiple uplink transmissions, and one or more other uplink transmissions included in the multiple uplink transmissions.

Aspect 51: The method of Aspect 50, wherein the indication is not transmitted in association with a particular uplink transmission, included in the multiple uplink transmissions, based at least in part on a determination that the UE is able to maintain phase coherence across the particular uplink transmission and at least one other uplink transmission included in the multiple uplink transmissions.

Aspect 52: The method of any of Aspects 40-51, wherein the multiple uplink transmissions are multiple physical uplink shared channel transmissions or are multiple physical uplink control channel transmissions.

Aspect 53: The method of any of Aspects 40-52, wherein receiving the request to apply the DMRS bundling comprises receiving the request in dedicated downlink control information (DCI), a physical uplink shared channel grant, a physical downlink shared channel grant, or a radio resource control message.

Aspect 54: The method of any of Aspects 40-53, wherein the request indicates a time period during which the DMRS bundling is to be applied, and wherein the multiple uplink transmissions are transmitted during the time period.

Aspect 55: The method of Aspect 54, wherein the time period is indicated as at least one of an absolute time period, a quantity of slots, or a quantity of uplink transmissions.

Aspect 56: A method of wireless communication performed by a network entity, comprising: transmitting, to a user equipment (UE), a request to apply demodulation reference signal (DMRS) bundling to uplink transmissions; receiving multiple uplink transmissions; and receiving an indication of whether the UE is able to comply with the request to apply DMRS bundling to the multiple uplink transmissions.

Aspect 57: The method of Aspect 56, wherein the indication of whether the UE is able to comply with the request indicates whether the UE is able to maintain phase coherence across the multiple uplink transmissions.

Aspect 58: The method of any of Aspects 56-57, further comprising performing joint channel estimation across all of the multiple uplink transmissions or a subset of the multiple uplink transmissions based at least in part on the indication of whether the UE is able to comply with the request.

Aspect 59: The method of any of Aspects 56-58, further comprising: identifying a subset of the multiple uplink transmissions to which joint channel estimation is to be applied based at least in part on the indication of whether the UE is able to comply with the request; and performing joint channel estimation across the subset of the multiple uplink transmissions.

Aspect 60: The method of any of Aspects 56-59, wherein the multiple uplink transmissions are multiple physical uplink shared channel (PUSCH) transmissions; and wherein receiving the indication of whether the UE is able to comply with the request comprises receiving the indication in uplink control information (UCI) that is multiplexed with a PUSCH transmission of the multiple PUSCH transmissions.

Aspect 61: The method of Aspect 60, wherein the indication of whether the UE is able to comply with the request consists of a single bit, in the UCI, that indicates whether the UE is able to maintain phase coherence across the PUSCH transmission and one or more other PUSCH transmissions included in the multiple PUSCH transmissions.

Aspect 62: The method of any of Aspects 56-59, wherein receiving the indication of whether the UE is able to comply with the request comprises receiving a particular DMRS sequence in association with an uplink transmission of the multiple uplink transmissions, wherein the particular DMRS sequence indicates whether the UE is able to maintain phase coherence across the uplink transmission and one or more other uplink transmissions included in the multiple uplink transmissions.

Aspect 63: The method of Aspect 62, wherein the particular DMRS sequence is one of: a first DMRS sequence that indicates that the UE is able to maintain phase coherence across the uplink transmission and the one or more other uplink transmissions, or a second DMRS sequence that indicates that the UE is not able to maintain phase coherence across the uplink transmission and the one or more other uplink transmissions.

Aspect 64: The method of any of Aspects 62-63, wherein receiving the particular DMRS sequence in association with the uplink transmission comprises one of: receiving a same DMRS sequence, in association with the uplink transmission, as a DMRS sequence used for the one or more other uplink transmissions to indicate that the UE is able to maintain phase coherence across the uplink transmission and the one or more other uplink transmissions, or receiving a different DMRS sequence, in association with the uplink transmission, than a DMRS sequence used for the one or more other uplink transmissions to indicate that the UE is not able to maintain phase coherence across the uplink transmission and the one or more other uplink transmissions.

Aspect 65: The method of any of Aspects 56-59, wherein receiving the indication of whether the UE is able to comply with the request comprises receiving the indication using a particular DMRS port, wherein the particular DMRS port indicates whether the UE is able to maintain phase coherence across an uplink transmission, of the multiple uplink transmissions, and one or more other uplink transmissions included in the multiple uplink transmissions.

Aspect 66: The method of any of Aspects 56-65, wherein the indication is received in association with every uplink transmission included in the multiple uplink transmissions.

Aspect 67: The method of any of Aspects 56-66, wherein the multiple uplink transmissions are multiple physical uplink shared channel transmissions or are multiple physical uplink control channel transmissions.

Aspect 68: The method of any of Aspects 56-67, wherein transmitting the request to apply the DMRS bundling comprises transmitting the request in dedicated downlink control information (DCI), a physical uplink shared channel grant, a physical downlink shared channel grant, or a radio resource control message.

Aspect 69: The method of any of Aspects 56-68, wherein the request indicates a time period during which the DMRS bundling is to be applied; and wherein the multiple uplink transmissions are received during the time period.

Aspect 70: The method of Aspect 69, wherein the time period is indicated as at least one of an absolute time period, a quantity of slots, or a quantity of uplink transmissions.

Aspect 71: An apparatus for wireless communication at a device, comprising a processor; memory coupled with the processor; and instructions stored in the memory and executable by the processor to cause the apparatus to perform the method of one or more of Aspects 40-55.

Aspect 72: A device for wireless communication, comprising a memory and one or more processors coupled to the memory, the one or more processors configured to perform the method of one or more of Aspects 40-55.

Aspect 73: An apparatus for wireless communication, comprising at least one means for performing the method of one or more of Aspects 40-55.

Aspect 74: A non-transitory computer-readable medium storing code for wireless communication, the code comprising instructions executable by a processor to perform the method of one or more of Aspects 40-55.

Aspect 75: A non-transitory computer-readable medium storing a set of instructions for wireless communication, the set of instructions comprising one or more instructions that, when executed by one or more processors of a device, cause the device to perform the method of one or more of Aspects 40-55.

Aspect 76: An apparatus for wireless communication at a device, comprising a processor; memory coupled with the processor; and instructions stored in the memory and executable by the processor to cause the apparatus to perform the method of one or more of Aspects 56-70.

Aspect 77: A device for wireless communication, comprising a memory and one or more processors coupled to the memory, the one or more processors configured to perform the method of one or more of Aspects 56-70.

Aspect 78: An apparatus for wireless communication, comprising at least one means for performing the method of one or more of Aspects 56-70.

Aspect 79: A non-transitory computer-readable medium storing code for wireless communication, the code comprising instructions executable by a processor to perform the method of one or more of Aspects 56-70.

Aspect 80: A non-transitory computer-readable medium storing a set of instructions for wireless communication, the set of instructions comprising one or more instructions that, when executed by one or more processors of a device, cause the device to perform the method of one or more of Aspects 56-70.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
    one or more memories; and
    one or more processors, coupled to the one or more memories, configured to:
        transmit a capability report indicating that the UE is capable of uplink demodulation reference signal (DMRS) bundling;
        receive a request to apply DMRS bundling to uplink transmissions;
        transmit multiple uplink transmissions; and
        transmit, for each of the multiple uplink transmissions an indication, in an uplink control information (UCI) or a particular DMRS sequence, based at least in part on the request, of whether the UE applies DMRS bundling to the each of the multiple uplink transmissions, based at least in part on whether the UE is able to maintain phase coherence across the multiple uplink transmissions.

2. The UE of claim 1, wherein the multiple uplink transmissions are multiple physical uplink shared channel (PUSCH) transmissions; and
    wherein the one or more processors, to transmit the indication of whether the UE applies DMRS bundling to the each of the multiple uplink transmissions, are configured to transmit the indication in the UCI, wherein the UCI is multiplexed with a PUSCH transmission of the multiple PUSCH transmissions.

3. The UE of claim 2, wherein the indication of whether the UE applies DMRS bundling to the each of the multiple uplink transmissions comprises a single bit, in the UCI, that indicates whether the UE is able to maintain phase coherence across the PUSCH transmission and one or more other PUSCH transmissions included in the multiple PUSCH transmissions.

4. The UE of claim 1, wherein the one or more processors, to transmit the indication of whether the UE applies DMRS bundling to the multiple uplink transmissions, are configured to transmit the particular DMRS sequence in association with an uplink transmission of the multiple uplink transmissions, wherein the particular DMRS sequence indicates whether the UE is able to maintain phase coherence across the uplink transmission and one or more other uplink transmissions included in the multiple uplink transmissions.

5. The UE of claim 4, wherein the particular DMRS sequence is one of:
    a first DMRS sequence that indicates that the UE is able to maintain phase coherence across the uplink transmission and the one or more other uplink transmissions, or
    a second DMRS sequence that indicates that the UE is not able to maintain phase coherence across the uplink transmission and the one or more other uplink transmissions.

6. The UE of claim 4, wherein the one or more processors are further configured to determine the particular DMRS sequence based at least in part on a formula, for a sequence initialization seed, that includes a parameter that represents whether the UE is able to maintain phase coherence across the uplink transmission and the one or more other uplink transmissions.

7. The UE of claim 4, wherein the one or more processors, to transmit the particular DMRS sequence in association with the uplink transmission, are configured to:
    transmit a same DMRS sequence, in association with the uplink transmission, as a DMRS sequence used for the one or more other uplink transmissions to indicate that the UE is able to maintain phase coherence across the uplink transmission and the one or more other uplink transmissions, or
    transmit a different DMRS sequence, in association with the uplink transmission, than the DMRS sequence used for the one or more other uplink transmissions to indicate that the UE is not able to maintain phase coherence across the uplink transmission and the one or more other uplink transmissions.

8. The UE of claim 7, wherein the one or more processors are further configured to select the particular DMRS sequence from a pool of DMRS sequences that includes at least three DMRS sequences, wherein the different DMRS sequence is selected as a next DMRS sequence in the pool.

9. The UE of claim 1, wherein the one or more processors, to transmit the indication of whether the UE applies DMRS bundling to the each of the multiple uplink transmissions, are configured to transmit the indication using a particular DMRS port, wherein the particular DMRS port indicates whether the UE is able to maintain phase coherence across an uplink transmission, of the multiple uplink transmissions, and one or more other uplink transmissions included in the multiple uplink transmissions.

10. The UE of claim 1, wherein the indication is transmitted in association with every uplink transmission included in the multiple uplink transmissions.

11. The UE of claim 1, wherein the one or more processors, to transmit the indication of whether the UE applies DMRS bundling to the multiple uplink transmissions, are configured to transmit the indication based at least in part on a determination that the UE is not able to maintain phase coherence across an uplink transmission, of the multiple uplink transmissions, and one or more other uplink transmissions included in the multiple uplink transmissions.

12. The UE of claim 11, wherein the indication is not transmitted in association with a particular uplink transmission, included in the multiple uplink transmissions, based at least in part on the determination that the UE is able to maintain phase coherence across the particular uplink transmission and at least one other uplink transmission included in the multiple uplink transmissions.

13. The UE of claim 1, wherein the multiple uplink transmissions are multiple physical uplink shared channel transmissions or are multiple physical uplink control channel transmissions.

14. The UE of claim 1, wherein the one or more processors, to receive the request to apply the DMRS bundling, are configured to receive the request in dedicated downlink control information (DCI), a physical uplink shared channel grant, a physical downlink shared channel grant, or a radio resource control message.

15. The UE of claim 1, wherein the request indicates a time period during which the DMRS bundling is applied, and wherein the multiple uplink transmissions are transmitted during the time period.

16. The UE of claim 15, wherein the time period is indicated as at least one of an absolute time period, a quantity of slots, or a quantity of uplink transmissions.

17. A network entity for wireless communication, comprising:
one or more memories; and
one or more processors, coupled to the one or more memories, configured to:
receive a capability report indicating that a user equipment (UE) is capable of uplink demodulation reference signal (DMRS) bundling;
transmit, to the UE, a request to apply DMRS bundling to uplink transmissions;
receive multiple uplink transmissions; and
receive, for each of the multiple uplink transmissions, in an uplink control information (UCI) or a particular DMRS sequence, an indication of whether the UE applies DMRS bundling to the each of the multiple uplink transmissions.

18. The network entity of claim 17, wherein the indication of whether the UE applies DMRS bundling to the each of the multiple uplink transmissions indicates whether the UE is able to maintain phase coherence across the multiple uplink transmissions.

19. The network entity of claim 17, wherein the one or more processors are further configured to perform joint channel estimation across all of the multiple uplink transmissions or a subset of the multiple uplink transmissions based at least in part on the indication of whether the UE applies DMRS bundling to uplink transmissions.

20. The network entity of claim 17, wherein the one or more processors are further configured to:
identify a subset of the multiple uplink transmissions to which joint channel estimation is to be applied based at least in part on the indication of whether the UE applies DMRS bundling to the each of the multiple uplink transmissions; and
perform joint channel estimation across the subset of the multiple uplink transmissions.

21. The network entity of claim 17, wherein the multiple uplink transmissions are multiple physical uplink shared channel (PUSCH) transmissions; and
wherein the one or more processors, to receive the indication of whether the UE applies DMRS bundling to the each of the multiple uplink transmissions, are configured to receive the indication that the UCI, wherein the UCI is multiplexed with a PUSCH transmission of the multiple PUSCH transmissions.

22. The network entity of claim 17, wherein the one or more processors, to receive the indication of whether the UE applies DMRS bundling to uplink transmissions, are configured to receive the particular DMRS sequence in association with an uplink transmission of the multiple uplink transmissions, wherein the particular DMRS sequence indicates whether the UE is able to maintain phase coherence across the uplink transmission and one or more other uplink transmissions included in the multiple uplink transmissions.

23. The network entity of claim 17, wherein the one or more processors, to receive the indication of whether the UE applies DMRS bundling to the each of the multiple uplink transmissions, are configured to receive the indication using a particular DMRS port, wherein the particular DMRS port indicates whether the UE is able to maintain phase coherence across an uplink transmission, of the multiple uplink transmissions, and one or more other uplink transmissions included in the multiple uplink transmissions.

24. The network entity of claim 17, wherein the one or more processors, to transmit the request to apply the DMRS bundling, are configured to transmit the request in dedicated downlink control information (DCI), a physical uplink shared channel grant, a physical downlink shared channel grant, or a radio resource control message.

25. The network entity of claim 17, wherein the request indicates a time period during which the DMRS bundling is applied; and
wherein the multiple uplink transmissions are transmitted during the time period.

26. The network entity of claim 25, wherein the time period is indicated as at least one of an absolute time period, a quantity of slots, or a quantity of uplink transmissions.

27. A method of wireless communication performed by a user equipment (UE), comprising:
transmitting a capability report indicating that the UE is capable of uplink demodulation reference signal (DMRS) bundling;
receiving a request to apply DMRS bundling to uplink transmissions;
transmitting multiple uplink transmissions; and
transmitting, for each of the multiple uplink transmissions an indication, in an uplink control information (UCI) or a particular DMRS sequence, based at least in part on the request, of whether the UE applies DMRS bundling to the each of the multiple uplink transmissions, based at least in part on whether the UE is able to maintain phase coherence across the multiple uplink transmissions.

28. The method of claim 27, wherein the multiple uplink transmissions are multiple physical uplink shared channel (PUSCH) transmissions; and
wherein transmitting the indication of whether the UE applies DMRS bundling to the each of the multiple uplink transmissions comprises transmitting the indication in the UCI, wherein the UCI is multiplexed with a PUSCH transmission of the multiple PUSCH transmissions.

29. The method of claim 27, wherein transmitting the indication of whether the UE applies DMRS bundling to the each of the multiple uplink transmissions comprises transmitting the particular DMRS sequence in association with an uplink transmission of the multiple uplink transmissions, wherein the particular DMRS sequence indicates whether the UE is able to maintain phase coherence across the uplink transmission and one or more other uplink transmissions included in the multiple uplink transmissions.

30. A method of wireless communication performed by a network entity, comprising:
- receiving a capability report indicating that a user equipment (UE) is capable of uplink demodulation reference signal (DMRS) bundling;
- transmitting, to the UE, a request to apply DMRS bundling to uplink transmissions;
- receiving multiple uplink transmissions; and
- receiving, for each of the multiple uplink transmissions, an indication, in an uplink control information (UCI) or a particular DMRS sequence, of whether the UE applies DMRS bundling to the each of the multiple uplink transmissions.

* * * * *